(12) United States Patent
Armstrong-Crews et al.

(10) Patent No.: US 9,514,378 B2
(45) Date of Patent: Dec. 6, 2016

(54) SPACE-TIME MODULATED ACTIVE 3D IMAGER

(71) Applicants: Nicholas Lloyd Armstrong-Crews, Westford, MA (US); Bryce Jason Remesch, Arlington, MA (US)

(72) Inventors: Nicholas Lloyd Armstrong-Crews, Westford, MA (US); Bryce Jason Remesch, Arlington, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 14/855,752

(22) Filed: Sep. 16, 2015

(65) Prior Publication Data

US 2016/0004920 A1    Jan. 7, 2016

Related U.S. Application Data

(63) Continuation of application No. PCT/US2015/022383, filed on Mar. 25, 2015.
(Continued)

(51) Int. Cl.
*H04N 13/02* (2006.01)
*G06K 9/20* (2006.01)
(Continued)

(52) U.S. Cl.
CPC ............ *G06K 9/2027* (2013.01); *G03B 35/00* (2013.01); *G06K 9/40* (2013.01); *H04N 5/378* (2013.01);
(Continued)

(58) Field of Classification Search
CPC ........ G06K 9/2027; G06K 9/40; G03B 35/00; H04N 13/0253; H04N 13/0271; H04N 13/021; H04N 13/0296; H04N 13/0239; H04N 2013/0081; H04N 5/378
(Continued)

(56) References Cited

U.S. PATENT DOCUMENTS 4,062,623 A    12/1977    Suzuki et al.
4,783,593 A    11/1988    Noble
(Continued)

FOREIGN PATENT DOCUMENTS

CN    201514512 U    6/2010
CN    202057893 U    11/2011
(Continued)

OTHER PUBLICATIONS

Bove, Michael V., et al., "Personal projectors based on VCSEL arrays", Proc. SPIE 5002, Projection Displays IX, 1, pp. 1-6, Mar. 31, 2013.
(Continued)

*Primary Examiner* — Allen Wong
(74) *Attorney, Agent, or Firm* — Cooley LLP

(57) ABSTRACT

Three-dimensional imagers have conventionally been constrained by size, weight, and power ("SWaP") limitations, readout circuitry bottlenecks, and the inability to image in sunlit environments. As described herein, an imager can illuminate a scene with spatially and temporally modulated light comprising a viewpoint-invariant pattern. The imager can detect diffuse reflections from the illuminated scene to produce a first image. The first image is background-corrected and compared with respect to a known reference image to produce a depth image. The imager can perform in sunlit environments and has improved SWaP and signal-to-noise (SNR) characteristics over existing technologies.

19 Claims, 16 Drawing Sheets

Related U.S. Application Data

(60) Provisional application No. 61/970,068, filed on Mar. 25, 2014.

(51) Int. Cl.

| | | |
|---|---|---|
| *G06K 9/40* | (2006.01) | |
| *H04N 5/378* | (2011.01) | |
| *G03B 35/00* | (2006.01) | |
| *H04N 13/00* | (2006.01) | |

(52) U.S. Cl.
CPC ........ *H04N 13/021* (2013.01); *H04N 13/0239* (2013.01); *H04N 13/0253* (2013.01); *H04N 13/0271* (2013.01); *H04N 13/0296* (2013.01); *H04N 2013/0081* (2013.01)

(58) Field of Classification Search
USPC .......................................................... 348/46
See application file for complete search history.

(56) References Cited

U.S. PATENT DOCUMENTS

| | | | |
|---|---|---|---|
| 5,048,967 | A | 9/1991 | Suzuki et al. |
| 5,193,120 | A | 3/1993 | Gamache et al. |
| 5,245,596 | A | 9/1993 | Gupta et al. |
| 5,591,985 | A | 1/1997 | Tsuji et al. |
| 6,248,487 | B1 | 6/2001 | Cohn et al. |
| 6,445,470 | B1 | 9/2002 | Jenkins et al. |
| 6,683,675 | B2 | 1/2004 | Aoyama |
| 6,940,611 | B2 | 9/2005 | Babayoff et al. |
| 7,103,212 | B2 | 9/2006 | Hager et al. |
| 7,176,440 | B2 | 2/2007 | Cofer et al. |
| 7,492,523 | B2 * | 2/2009 | Dolgoff .............. G02B 27/2278 359/471 |
| 7,742,640 | B1 | 6/2010 | Carlson et al. |
| 8,180,101 | B2 | 5/2012 | Sun et al. |
| 8,320,621 | B2 | 11/2012 | McEldowney |
| 8,744,763 | B2 | 6/2014 | Hawkinson et al. |
| 8,786,861 | B2 | 7/2014 | Funamoto |
| 9,018,578 | B2 | 4/2015 | Tobiason |
| 2009/0190139 | A1 | 7/2009 | Fisher et al. |
| 2010/0043706 | A1 | 2/2010 | Jung et al. |
| 2010/0149551 | A1 | 6/2010 | Malinkevich |
| 2010/0268458 | A1 | 10/2010 | Becker et al. |
| 2010/0274481 | A1 | 10/2010 | Krishnaswamy et al. |
| 2010/0290698 | A1 | 11/2010 | Freedman et al. |
| 2011/0229840 | A1 | 9/2011 | Liang et al. |
| 2012/0063672 | A1 | 3/2012 | Gordon et al. |
| 2012/0281087 | A1 | 11/2012 | Kruse |
| 2013/0016362 | A1 | 1/2013 | Gong et al. |
| 2013/0250066 | A1 | 9/2013 | Abraham |
| 2014/0168380 | A1 | 6/2014 | Heidemann et al. |
| 2014/0267619 | A1 | 9/2014 | Bridges |

FOREIGN PATENT DOCUMENTS

| | | |
|---|---|---|
| WO | WO 2007/043036 A1 | 4/2007 |
| WO | WO 2007/105205 A2 | 9/2007 |

OTHER PUBLICATIONS

Gupta, Mohit et al., "Structured Light 3D Scanning in the Presence of Global Illumination", 2011 IEEE Conference on Computer Vision and Pattern Recognition (CVPR), pp. 713-720, Jun. 20, 2011.

Gupta, Mohit et al., "Structured Light in Sunlight", IEEE Conference on Computer Vision (ICCV), pp. 1-8, Dec. 2013.

Horn, Berthold K. P. et al., "Determining Optical Flow", Artificial Intelligence, vol. 17, pp. 185-203, Nov. 12, 1981.

Konolige, Kurt, "Projected Texture Stereo", ICRA Conference, May 3-7, 2010, pp. 148-155.

Lim, Jongwoo, "Optimized Projection Pattern Supplementing Sterio Systems", Conference on IEEE Robotics and Automation, pp. 2823-2829, May 12-17, 2009.

Lucas, B.D. et al., "An Iterative Image Registration Technique with an Application to Stereo Vision", Proceedings of DARPA Image Understanding Workshop, pp. 121-130, Apr. 23, 1981.

Molinier, T. et al., "Projector View Synthesis and Virtual Texturing", The 2$^{nd}$ International Topical Meeting on Optical Sensing and Artificial Vision, Russia, 8 pages, May 2008.

Tonry, J. L. et al., "The Orthogonal Transfer CCD", Publications of the Astronomical Society of the Pacific, vol. 109, pp. 1154-1164, Oct. 1997.

Tyrell, Brian et al., "Time Delay Integration and In-Pixel Spatiotemporal Filtering Using a Nanoscale Digital CMOS Focal Plane Readout", IEEE Transactions on Electron Devices, vol. 56, No. 11, pp. 2516-2523, Nov. 2009.

Tsai-Chun Liang, "The Design of a Noble VCSEL with DOE", Novel Optical Systems Design and Optimization X, Proc. SPIE, vol. 6668, pp. 66680U-1 thru 66680U-8, Sep. 19, 2007.

International Search Report and Written Opinion, mailed Jul. 8, 2015 for PCT/US2015/022383, filed Mar. 25, 2015.

\* cited by examiner

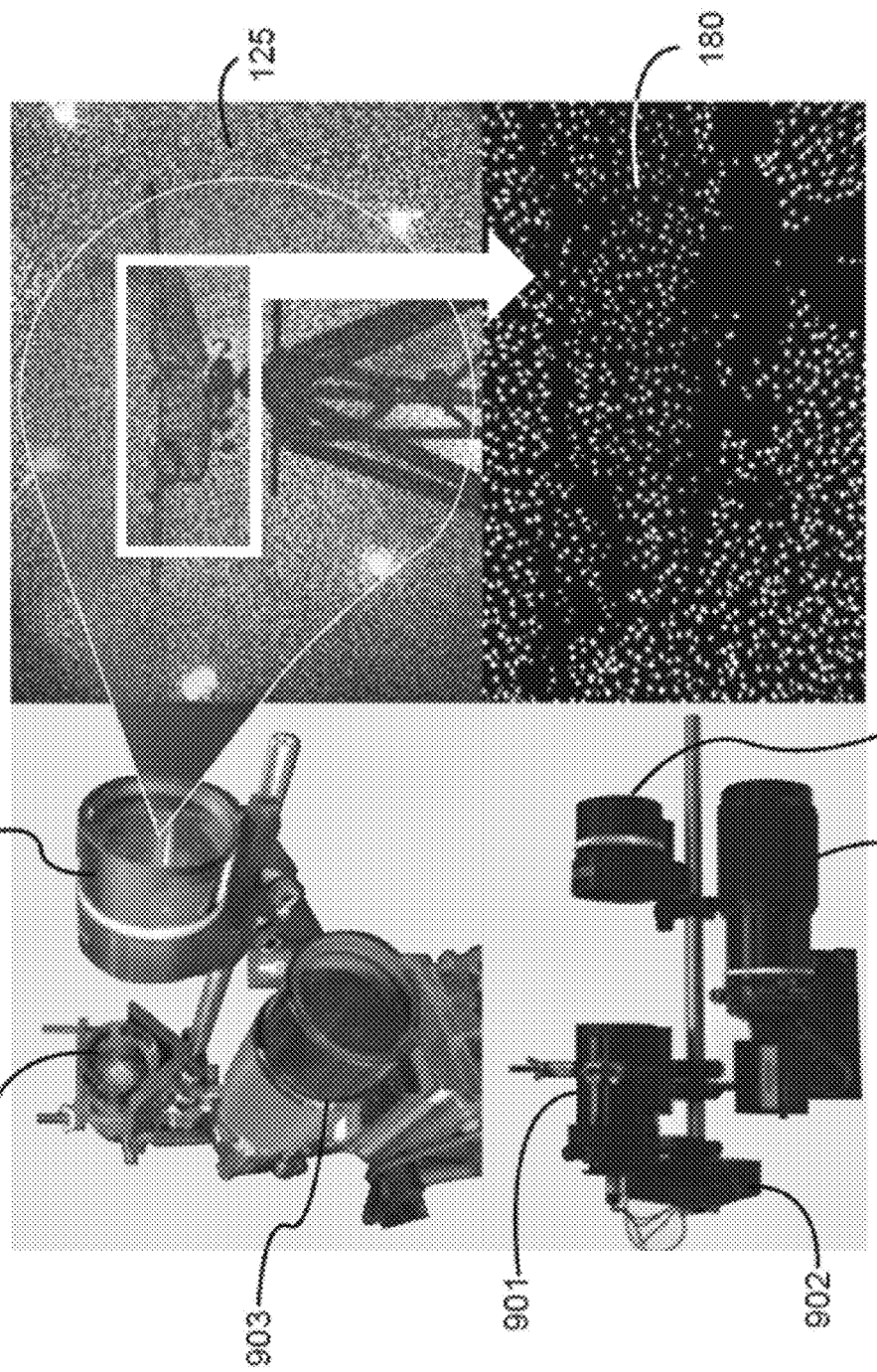

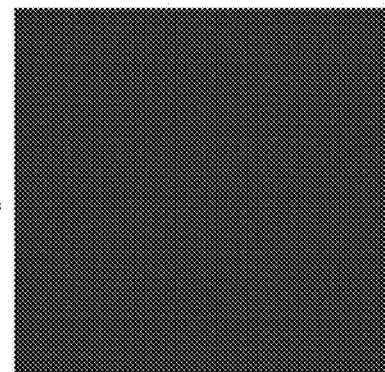
FIG. 14E
Boosted Signal
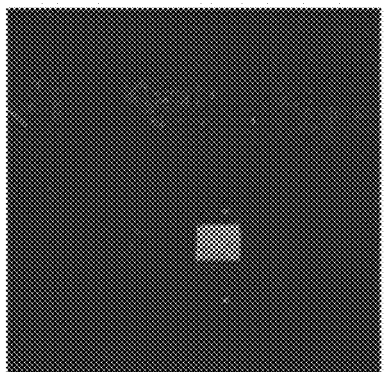
Boosted Signal
FIG. 14F
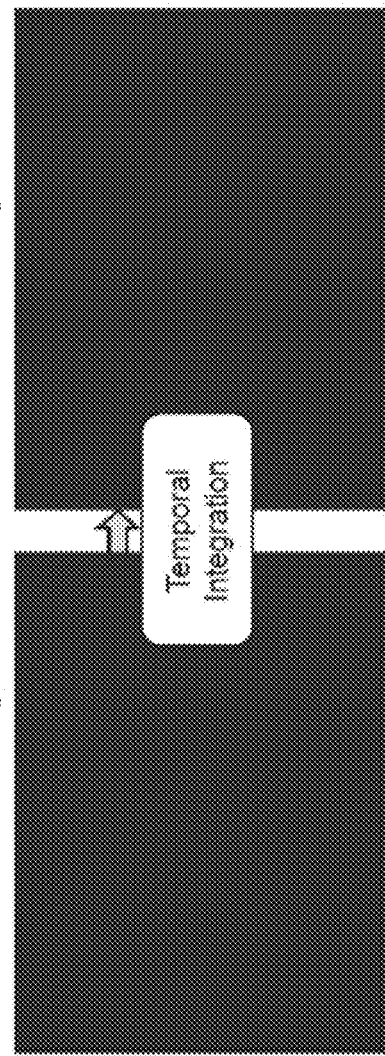
FIG. 14C
Scene-distorted Signal
Scene-distorted Signal
FIG. 14D
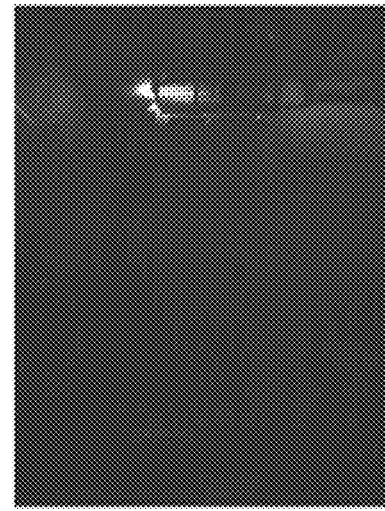
FIG. 14A
Laser-illuminated Scene
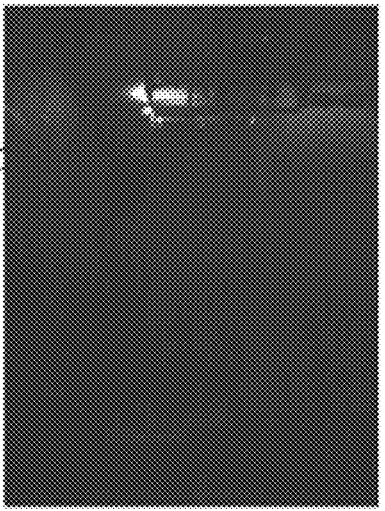
Background
FIG. 14B

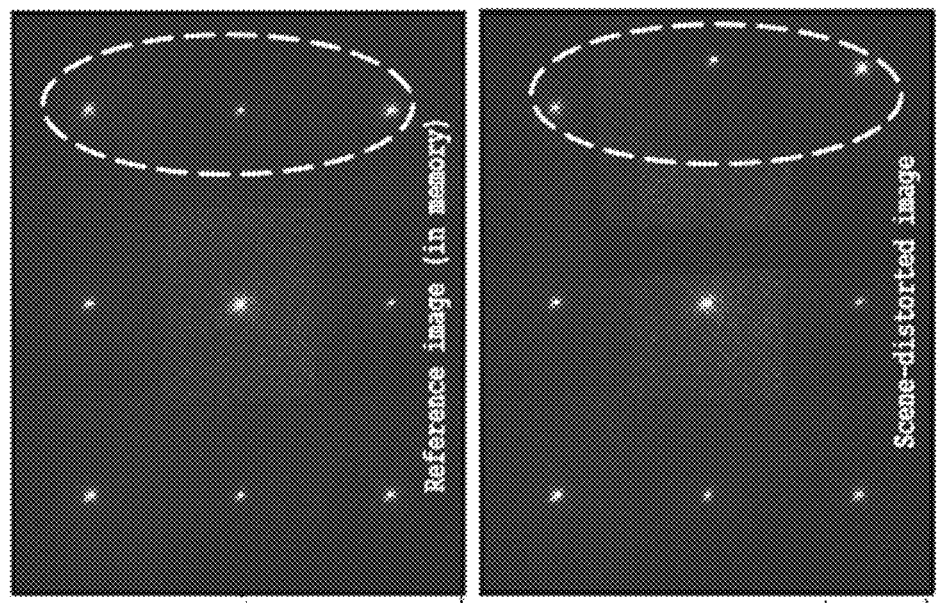
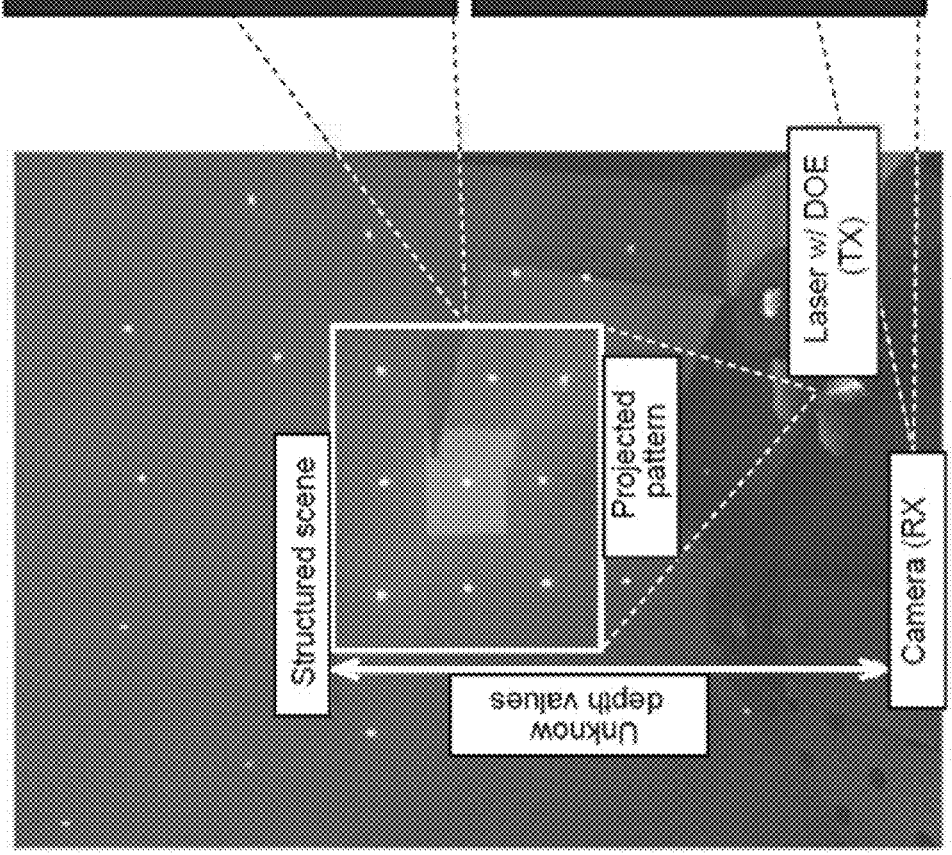

US 9,514,378 B2

SPACE-TIME MODULATED ACTIVE 3D IMAGER

CROSS-REFERENCE TO RELATED PATENT APPLICATIONS

This application is a Continuation of International Application No. PCT/US2015/022383, titled "Space-Time Modulated Active 3D Imager" and filed Mar. 25, 2015, which claims priority to U.S. Provisional Application No. 61/970,068, filed Mar. 25, 2014, titled "Space-Time Modulated Active 3D Imager On-Chip." Each of the foregoing applications is hereby incorporated herein by reference in its entirety.

GOVERNMENT SUPPORT

This invention was made with government support under Contract No. FA8721-05-C-0002, awarded by the U.S. Air Force. The government has certain rights in the invention.

BACKGROUND

Emerging technologies across defense, commercial, and industrial sectors have demonstrated numerous advantages of three-dimensional ("3D") sensing over two-dimensional ("2D") imaging and video (see, for example, Microsoft's Kinect and Lincoln Laboratory's MACHETE). Despite progress in these areas, however, a gap remains with regard to low size, weight, and power (SWaP), day/night, medium-range applications. Furthermore, many existing detector schemes suffer from readout circuitry speed/processing bottlenecks. Missions increasingly require performance that exceeds existing imaging capabilities, for example as unmanned systems proliferate, and as such the need for greater autonomy in even the smallest platforms is increasingly apparent.

SUMMARY

Embodiments of the present invention include a method of generating a three-dimensional image of a scene. The method includes illuminating a scene with a monochromatic beam of light that is (1) spatially modulated with a pseudo-random, two-dimensional pattern; and (2) temporally modulated. A detector acquires at least one first image of the scene while the scene is illuminated with the monochromatic beam of light and at least one second image of the scene while the scene is not illuminated with the spatially modulated monochromatic light. A three-dimensional image of the scene is estimated based at least in part on the difference between the at least one first image and the at least one second image.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 9A is a perspective photograph of an imaging apparatus, according to some embodiments.

FIG. 9B is an image, acquired by the imaging apparatus of FIG. 9A, of a target under illumination.

FIG. 9C is a signal image recovered by digitally coherent detection, comprising the transmitted pattern as projected onto the scene shown in FIG. 9B.

FIG. 9D is a side view of the imaging apparatus of FIG. 9A, showing a digital coherent processing unit, a transmitter and a receiver.

FIGS. 14A-14F show a progression of images acquired by an imaging apparatus of the disclosure, showing background subtraction, temporal integration, and white balancing, according to some embodiments.

FIG. 15A is a photograph of a structured scene illuminated by a projected pattern transmitted from an imaging apparatus of the disclosure, according to some embodiments. FIG. 15B shows a reference image stored in a memory of the imaging apparatus of FIG. 15A. FIG. 15C shows a scene-distorted image collected at a receiver of the imaging apparatus of FIG. 15A after illumination of the structured scene of FIG. 15A.

DETAILED DESCRIPTION

Figure 1:
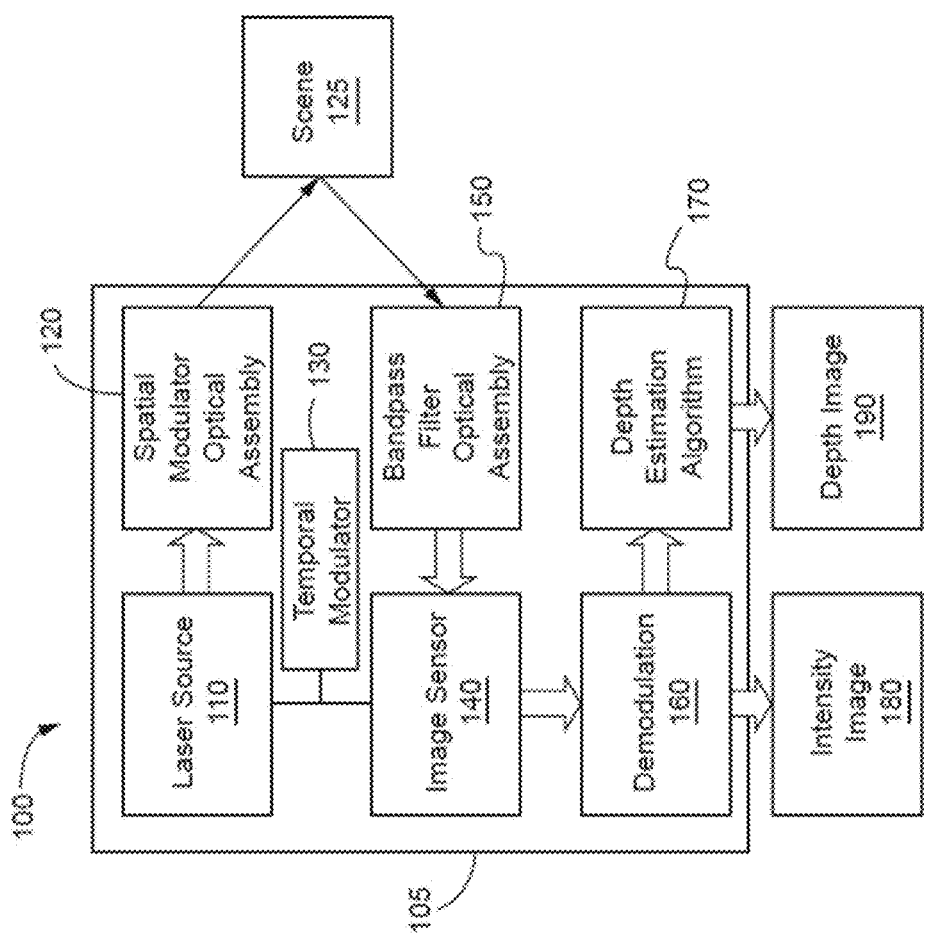
FIG. 1 is a system block diagram of an imaging apparatus according to some embodiments.

Existing three-dimensional ("3D") imaging technologies cannot meet the low size, weight, and power (SWaP) requirements for certain day/night, medium-range applications. Furthermore, many existing image detector schemes suffer from readout circuitry bottlenecks, including limited data rate and high read noise. Embodiments of the present invention (also referred to herein as Structured Light Detection and Ranging, or "SLiDAR") unify active optical and stereo vision for 3D sensing that can overcome these shortcomings. SLiDAR includes an active, three-dimensional ("3D") imager that produces a dense depth map (e.g., a 3D point cloud) of a scene within its field-of-view using active stereo projection imaging of the scene with "structured light" (i.e., a known pattern of light that is projected onto a scene). Components can include a source (e.g., a laser transmitter), a detector (e.g., an image sensor), and one or more processing component(s).

During operation of the imager, a known pattern of light is projected onto the scene from the source (also referred to herein as a transmitter ("TX"), or "active illumination source"), for example a laser source. SLiDAR can both spatially and temporally modulate the active illumination source as described herein. The projected pattern of light bounces off the scene, and is globally imaged by the detector (also referred to herein as a receiver ("RX"), for example, a "detector array"). One or more processing algorithms then infer the 3D structure of the scene by comparing the detected image to a known, pre-calibrated reference image. For example, the apparent parallax between a feature in the detected image and a feature in the reference pattern is inversely proportional to its range, which can be recovered by feature-matching on a computational processor ("CPU"). The imager generates output data (e.g., the depth map) which can appear as a conventional two-dimensional image, but instead of containing light intensity values at each pixel, contains a depth (a.k.a. "range") value, thereby preserving the 3D scene structure. Additionally, as a by-product, the imager can also output a 2D gray-scale intensity image. The imager can operate at a high frame-rate, so that the sequence of 2D and/or 3D images output can be considered full-motion video.

In some embodiments, the imager is a tightly-integrated system of a laser light source, optics, photo-sensitive focal plane array, and integrated circuit electronics. An integrated system of the present disclosure can include all components (except, in some instances, the source) integrated onto a single integrated circuit ("IC") chip. A variety of embodiments of the present disclosure can be obtained by swapping components to fulfill the TX, RX, CPU roles, e.g., to meet a range of performance goals unmet by previous systems. For example, SLiDAR can comprise a machine-vision smart camera, custom spatiotemporally modulated laser projection, and/or off-board processing. In some embodiments, SLiDAR comprises one or more digital focal-plane arrays and/or one or more Geiger-mode avalanche photodiodes, to achieve low-SWaP, high-quality 3D sensing.

Output data of the imager can comprise a high-fidelity capture of the scene (static or dynamic), and can be used for a wide variety of applications, such as robotics (e.g., indoor and outdoor ground robotics), surveying, emergency response, entertainment, and military applications. For example, embodiments of the present invention can be implemented in driverless or driver-assisted cars, autonomous unmanned air vehicles ("UAV"s), consumer mobile 3D photography, augmented reality visualization (e.g., for gaming), GPS-denied navigation, missile guidance systems, as-built architectural or engineering drawings, damaged building surveys for disaster response, home marketing, appraisal, safety inspection, renovation modeling, energy survey, 3D gaming, simulation, training in high-fidelity virtual replicas of real-world environments, historic preservation, blue-force tracking (e.g., for military or first responders), movie production (e.g., capturing virtual representations of real-world sets), and human navigation in obscured (e.g. smoke-filled) or unknown environments (e.g., caves or shanty towns).

Compared to existing 3D sensors, SLiDAR can provide numerous advantages, such as indoor and outdoor operation, day or night operation, extended maximum range compared to existing commercial, full-frame infrared (IR) structured light imagers such as Microsoft Kinect, Google Tango, and Asus Xtion (e.g., 10 times the maximum range (100 m)), wide field-of-view at high resolution, robustness to featureless and/or feature-aliased environments, robustness to sensor platform motion, accuracy and area-coverage rate improvements, reduced small SWaP requirements (e.g., 90% optical power reduction), and on-chip computation (e.g., no external processing required; no limitations on host operating system, programming language, etc.). Imaging in sunlit conditions can be made possible by the subtraction of background signal from a collected image signal (e.g., enhancing the sensitivity at the detector by reducing noise in the signal), which can be accomplished by temporal modulation of the source light, together with spectral filtering of the modulated signal reflected by the imaged scene. The in-pixel computation of background subtraction and image stabilization of some embodiments overcome the bottleneck of the read-out circuitry, yielding improved signal-to-noise ratio, dynamic range, and size/weight/power.

SLiDAR for Space-Time Modulated Active 3D Imaging

FIG. 1 is a system block diagram of a SLiDAR system 100 comprising an imaging apparatus, or "imager" 105, according to some embodiments. A laser source 110 is electrically and/or optically connected to, and temporally modulated by, a temporal modulator 130. If electrically connected, the laser source 110 can be amplitude modulated. If optically connected, the laser source can be amplitude modulated, frequency modulated and/or phase modulated. Any of these methods can be used to adjust the projected images. For amplitude modulation, a mechanical shutter, an electro-optic shutter (e.g., a Pockel cell or a liquid crystal cell), an iris, or an acousto-optic modulator can be used. For phase modulation, an electro-optic phase modulator, etalon, waveplate, wedge, window or phase retarder or acousto-optic modulator can be used. For frequency modulation, an etalon or harmonic generator can be used. The laser source 110 can be a laser diode, fiber laser, quantum cascade laser, vertical cavity laser, gas laser, collimated light-emitting diode (LED), or any other directional, coherent source. If using a diffractive optic to generate the pattern, the source should be phase coherent, and does not have to be directionally specific (e.g., assuming that at least a portion of the light is collimated prior to reaching the diffractive optical element, "DOE," discussed further below). As such, LEDs and cavity lasers can be used. The laser source 110 can include a lasing medium and its associated driving circuitry (for example, a laser diode), internal optics to collimate the beam, and/or external optics to adapt field-of-view, depending upon the embodiment. Light emitted by the laser source 110 can be monochromatic, and can be of any wavelength visible/detectable by a chosen detector (e.g., visible, near-infrared, short-wave infrared, etc.). For example, the laser source 110 may emit light having a wavelength of 850 nm or of 1550 nm. The laser source can be configured to emit one monochromatic beam or a plurality of monochromatic beams (e.g., a first monochromatic beam and a second monochromatic beam of a slightly different wavelength than that of the first monochromatic beam).

The laser source 110 is in optical communication with a spatial modulator optical assembly 120 (also referred to as a spatial light modulator, "SLM"). The type of spatial modulation produced by the spatial modulator optical assembly 120 can be amplitude modulation, phase modulation, or both. For example, an output laser beam, emitted from the laser source 110, passes through the spatial modulator optical assembly 120 (e.g., comprising one or more lenses for focusing and/or conditioning the transmitted light) and is incident on a scene 125 that is external to the imager 100. The SLM can include one or more elements in series, each of which, for example, being one of: a diffractive element such as a diffractive optical grating, an array of micromirrors, an acousto-optic modulator, a microlens array (lenslet), a liquid crystal SLM, and/or an electro-optic modulator. Some spatial modulation techniques use phase-coherent light sources (such as diffractive elements) while others do not use phase coherence (such as microlens arrays). If an incoherent light source is used, a refractive element (such as a prism or lenslet array) can be used instead of a diffractive element (such as a grating or interference screen). If a coherent light source is used, either a refractive element or a diffractive element can be used.

In some embodiments, instead of a laser source 110, a non-directional coherent or substantially coherent source, such as a light emitting diode (LED) can be used. For example, an LED is a source that is spectrally coherent, but may not be substantially phase coherent. In some embodiments, an incoherent source, such as a halogen bulb, can be used in place of the laser source 110.

In some embodiments, a transmitter assembly of the present disclosure includes at least three compound components: (1) a source of illumination (e.g., a laser, LED, or other coherent source, or an incoherent source); (2) a source of modulation (e.g., a diffractive optical element, an electro-optic or acousto-optic modulator if a coherent source is provided, or a lenslet or microlens array, which works with both coherent and incoherent sources); and (3) a suitable lens stack. The lens stack may include one or more lenses/elements before and/or after the modulation element. Lenses before the modulation element can condition the beam for appropriate spatial modulation. Lenses after the modulation element can condition the spatially modulated pattern such that it is well suited for the target of interest. This includes focusing the spots at the desired range, as well as ensuring the pattern has the appropriate size and intensity at the target.

The source can be modulated spatially, temporally, or both: spatially, by passing it through the spatial modulator optical assembly 120; and temporally, via the temporal modulator 130, for example by altering a drive current to the laser source 110, and/or by temporally modulating the spatial modulation imparted by spatial modulator optical assembly 120. In some embodiments, instead of being electrically connected to the laser source 110, the temporal modulator 130 can be connected to the SLM, or can be an independently-controlled component such as a mirror or shutter. The spatial modulator optical assembly 120 induces a pseudo-random pattern (e.g., it may convert the incoming laser beam into a pattern of light and dark "spots") that is locally distinct (a "visual signature"), allowing it to be substantially unambiguously identified and located in an image (e.g., with a signal-to-noise ratio of 2 to 1, meaning that the signal can be reliably raised to twice the background level).

As used herein, the term "locally distinct" means that each subregion of spots, which in some embodiments can be a continuous block of 4×4 or 5×5 spots, is encoded such that the spots form a pattern that can be recognized as distinct from the pattern present in neighboring blocks. The ability to distinguish one block from another means being able to calculate some overlap between a received block pattern and one or more block patterns stored in a lookup table. In some embodiments, this overlap can be a spatial cross-correlation, a covariance measure, a product or sum of difference, or a more advanced measure.

"Local" means within one region (e.g., 4×4 pixels or 5×5 pixels, the size of which varies with range), and "distinct" means uniquely distinct (i.e., there is only one region pattern of this type) within the entire pattern. The acceptable degree of confidence with which one region can be identified from another can vary significantly based on the collection conditions and/or the object observed. In some embodiments, this is an adaptive or preset threshold chosen to maximize identification. The timing of the capture of images (comprising the locally distinct regions) of the scene at the detector can be based on a temporal modulation of the source. For example, the temporal modulation imposed by the temporal modulator 130 can be an on-off square wave that is synchronized with an electronic shutter of a detector (e.g., an image sensor 140) so that the detector captures alternating images of the scene 125 with and without the source illumination that originates from laser source 110.

Light that exits the spatial modulator optical assembly 120 is scattered and/or reflected off one or more objects in the scene 125, and some or all of the scattered and/or reflected light enters a band-pass filter optical assembly 150 (e.g., comprising one or more lenses to collimate and/or focus the light passing through the band-pass filter optical assembly 150). The band-pass filter optical assembly 150 is in optical communication with the image sensor 140, which itself is, in some embodiments, electrically connected to the temporal modulator 130, e.g., for synchronization purposes. The band-pass filter optical assembly 150 can include one or more optical filters (e.g., band-pass optical filters) to limit incoming light, to the degree possible, to the source light. A band-pass filter need not be a single element. In other words, appropriate band-pass can be achieved by using multiple filters, multiple coatings on lens elements, or a combination thereof. The band-pass filter optical assembly 150 can be monochromatic and/or sensitive in the wavelength(s) of the source light (which, as stated above, may comprise one or more wavelengths).

The image sensor 140 can be a focal plane array of photo-sensitive elements, and can include optics to focus incoming light onto the focal plane. Images detected at the image sensor 140 are demodulated (e.g., with a demodulator 160), producing an intensity image 180. Demodulated signal data can also be used as an input to a depth estimation algorithm (e.g., by a depth estimation module 170) to generate a depth image 190 as described in greater detail below. In some embodiments, as shown in FIG. 1, the demodulation and the depth estimation algorithm are performed within the imager 105, and may be performed "on-chip" with other components of the imager 105.

The implementation of demodulation can vary based on the type of receiver used. For example, in the case of a full-array, global imager (such as a camera), spatial demodulation can occur simply by producing a focused image of the spatially modulated signal. In the focal field of the image plane, the amplitude peaks appear as distinct bright spots above the amplitude valleys, so the signal is readily apparent. In the case of an imager that doesn't see the full field at every measurement, such as a masked full frame imager or a scanning imager, the individual images may be recombined and/or ordered according to the spatial distribution of their collection region before the image is resolved and the signal extracted. In either case, the temporal demodulation of the signal (which is distinct from the spatial demodulation of the signal) can include the use of a 'digitally coherent' technique (explained in greater detail with reference to FIG. 13 and the "Background Subtraction and Image Processing" section below), which can include collecting a sequential series of both illuminated and unilluminated scenes, removing the values of the latter from the former, and then performing a weighted average on the result. In some instances, the pseudo-random pattern is a viewpoint-invariant, conditioned field (as explained in greater detail below, under the heading "Viewpoint-Invariant and Pseudo-Random Structured Light Patterns." A "conditioned" field means that the field, if measured over space and time, has distinct maxima and minima (e.g., see FIGS. 10A and 10B, and corresponding discussion below). These are enhanced above the background illumination by selectively sampling a received/detected image in time, and a depth measurement can be facilitated by extracting spatially modulated maxima that do not exist in the unilluminated scene.

The temporal modulation performed by the temporal modulator 130 (and, in some embodiments, the spectral filtering performed by one or more optical components in the spatial modulator optical assembly 130 and/or the band-pass filter optical assembly 150) can: (1) facilitate background subtraction (e.g., by collecting light from a scene while the source is off, and subtracting a corresponding signal at the receiver from the signal acquired during illumination with the source), making operation under sunlit conditions possible; (2) increase the amount of detected signal packed into the minimum amount of exposure time (e.g., to reduce background light contributions); (3) allow multiple imagers to concurrently image the same scene (or "target") without confusing each other by seeing each other's patterns (for example, while a first imager is illuminating a scene, a second imager is not illuminating the scene, and further is not collecting a background image while the first imager is illuminating the scene); and (4) allow a low duty cycle (e.g., one-tenth of one percent (0.1%=0.001) at near-infrared ("NIR") wavelengths and human accessible exposure levels in sunlit environments) on the laser to facilitate eye-safe operations and stay below the maximum permissible exposure limit in human accessible environments. In some embodiments, the duty cycle depends on background level, wavelength, and/or laser power level. In some embodiments, for example, where the imagers have unique spatial modulation schemes/patterns or unique temporal waveforms, operation of the multiple imagers can be concurrent instead of exclusive (i.e., "independent").

The collimation performed by optics in the laser source 110, the spatial modulator optical assembly 130, and/or the band-pass filter optical assembly 150 can yield small dots in the projected pattern, improving the contrast and/or detectability of the pattern against a background.

Optical Filtering

An optical filter can be implemented as an optical component with one or more coatings whose physical form and material properties allow for selectively passing certain wavelengths of incident light while reflecting or absorbing other wavelengths. Optical filters can include interference filters that exploit the properties of thin-film interference to achieve an appropriate band-pass. A physical filter can be thought of as a cavity of material with a constant optical index $\eta$ and a thickness of $\delta$. Light passing into this cavity from an outside medium can undergo internal reflection if the cavity's optical index is different from that of the outside medium. This means that the optical path of the light depends upon the index of the medium, the width of the cavity, and the angle of incidence. If the optical path length is an integer number of wavelengths of the incident light, the light interferes constructively when exiting the cavity, thus allowing transmission, but if the optical path length is a ½ integer number of wavelengths, the light interferes with itself destructively and results in little to no transmission. This is known as the interference criterion. The thickness $\delta$ of a cavity with optical refractive index n that passes light of wavelength $\lambda$ at normal incidence to the surface of the cavity is $$\delta = \frac{\lambda}{2*n}$$

For example, green light of wavelength 532 nm passing at normal incidence into a glass filter of optical refractive index 1.5 should be about 177.3 nm thick.

Physical filters can have surface defects that limit their performance and alter this condition. Small variations in the thickness and parallelism of the surface of the cavity, e.g., due to manufacturing imperfections, can alter this width and the optical path of the incident light, causing non-ideal transmission of the desired wavelength as well as leakage from nearby wavelengths. To achieve extremely narrow band-pass, in addition to requiring quality filter surfaces, one technique is to stack many such filters together, each having indices and thicknesses designed to mitigate these effects. This does not necessarily degrade transmitted performance as, according to Herpin's theorem, "a symmetrical thin-film combination is equivalent, at one wavelength, to a single film, characterized by an equivalent index and equivalent thickness."* Since the thickness of the medium and effective index of the medium are inversely proportional, one can achieve similar transmission for the same wavelength through either making a thicker filter or by using a medium of higher index. Accordingly, chemical coatings can be deposited onto standard optics to create filters of the same band-pass, but significantly smaller physical thickness than their wide cavity counterparts.

A significant challenge for systems imaging a wide field of view in a narrow spectral band, however, is the angle of incidence requirement. For the same filter noted above, if light at wavelength $\lambda_0$ arrives at an incident angle $\theta$ relative to the normal of the filter surface, then, to first order, the peak transmitted wavelength $\lambda_\theta$ will be:

$$\lambda_\theta = \lambda_0 \sqrt{1 - (\sin(\theta)/\eta)^2}$$

If the incident light is very narrow band, as may be the case for a laser line source, then the filter will not allow this light to pass. This can be addressed by several methods. One is to transmit a beam having a wide spectrum. While this allows more transmitted light to pass, it can require transmitting more power out of the particular spectral band of interest and can significantly complicate the remainder of the system.

For example, as noted above, use of a spectrally incoherent source can involve using a refractive optic to generate the spatial modulation. It can also result in a reduction in sensitivity since the signal can be more difficult to separate from background, e.g., using tight spectral filters along with the other techniques. A spectrally 'wide' laser can be nearly phase and relatively spectrally coherent (e.g., <40 nm FWHM spread), such that one can use a diffractive optic. Spectrally broadband illumination returned from the target may arrive at the receiver from many different angles. This angular spread could be accommodated with a complex, spatially variable optical filter whose central wavelength varies across the surface, a curved surface optical filter, or an optically coated lens.

Spectral exclusivity as built by interference filters can be directly proportional to the optical thickness of the filter, and therefore either number of layers of interference regions present, the layers' indices of refraction, or both. As such, an optical filter of narrow spectral acceptance can be thick, chemically complex, or involve non-ideal or complex incident geometry (such as using fold mirrors and/or lenses significantly larger than the beam path to achieve the appropriate curvature) if it is placed in a region of the beam with high angular diversity or allows multiple, discrete wavelengths to pass. One way to accommodate this optical thickness with a conventional filter is to place the filter in a region of the beam path that is not subject to wide incident angles, as disclosed herein (e.g., a telecentric region).

Other options include placing the filter in a region of the received beam path where the incident rays are nearly normal to the surface of the filter (semi-collimated region) or to optically coat the outermost lenses in the system, in which case the receiver lens geometry should be well matched to allow incident light to arrive nearly perpendicular to the surface of the lens over an a substantial area.

Depth Estimation

The depth estimation module 170 can produce a 3D depth image given inputs of a known reference image, the current 2D image of the scene produced by the image sensor 140, and, optionally, pre-calibrated and/or a priori knowledge of extrinsic optical geometry parameters (optical focal length, imager size, distance from source to detector). In addition, certain filtering steps can be computed in advance, including background subtraction, image rectification, and image stabilization, as explained in greater detail below. In some embodiments, the entire depth estimation module 170 is implemented on-chip, using in-pixel digitization of "digital focal plane arrays" and the linear space-time filtering capabilities of these chips.

In some embodiments, the depth estimation module 170, run independently for each pixel, first searches for corresponding sub-regions of the reference and (rectified) query images, finding the column offset (or "disparity") that best correlates the sub-regions; then uses knowledge of the stereo geometry relating the physical placement of sensor and detector to produce a depth image. Example pseudocode executed by the depth estimation module 170 proceeds as follows:

1. For each pixel:
   a. Calculate disparity:

$$\tau^* = \arg\max_\tau \sum_{\tau=1}^n \langle A[i, j], B[i, j+\tau]\rangle_K$$

i. At a putative column offset $\tau$, compute the correlation of the image sub-regions:

$$\langle A, B\rangle \equiv \sum_{dom(K)} A \cdot B \cdot K$$

1. In the prototype system, K is the "sum kernel," a 3×3 matrix with all entries being unity
   b. Calculate depth from disparity: $z=bf/\tau^*$
      i. where b is the "baseline" distance between source and detector; and
      ii. where f is the focal length of the detector optical lens.

System Architecture

Figure 2:
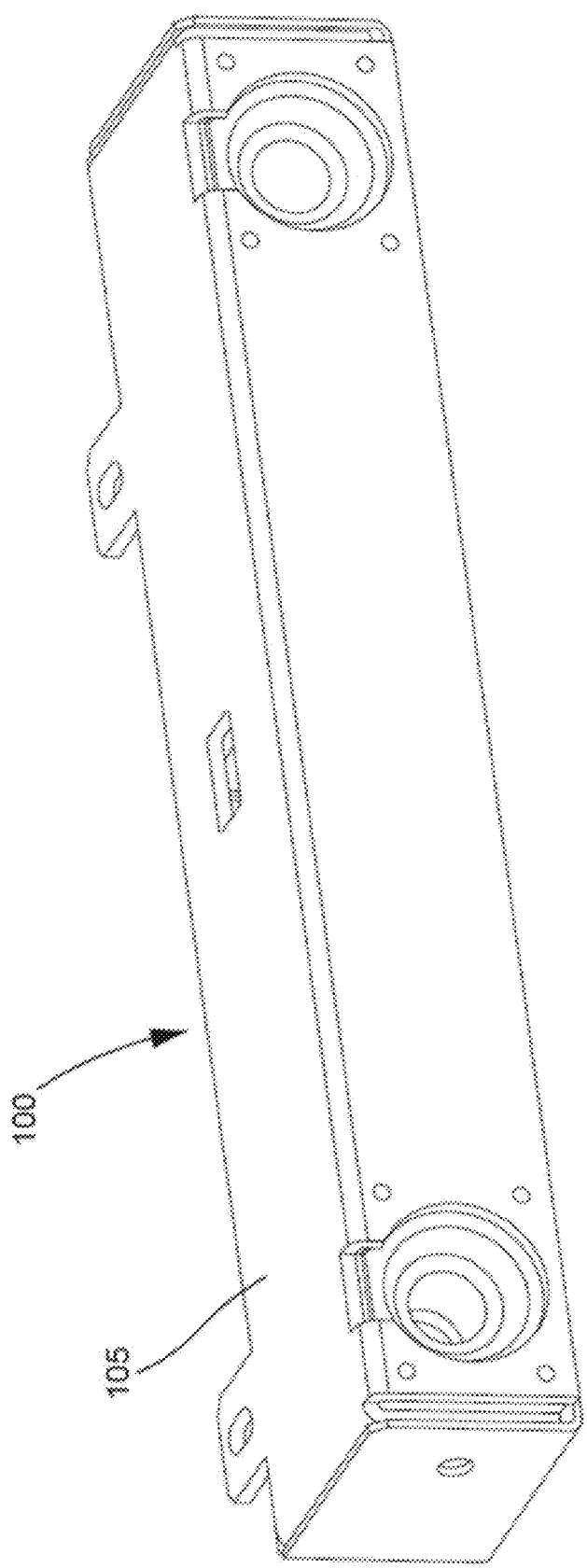
FIG. 2 is a rendering of an imaging apparatus according to some embodiments.
Figure 3:
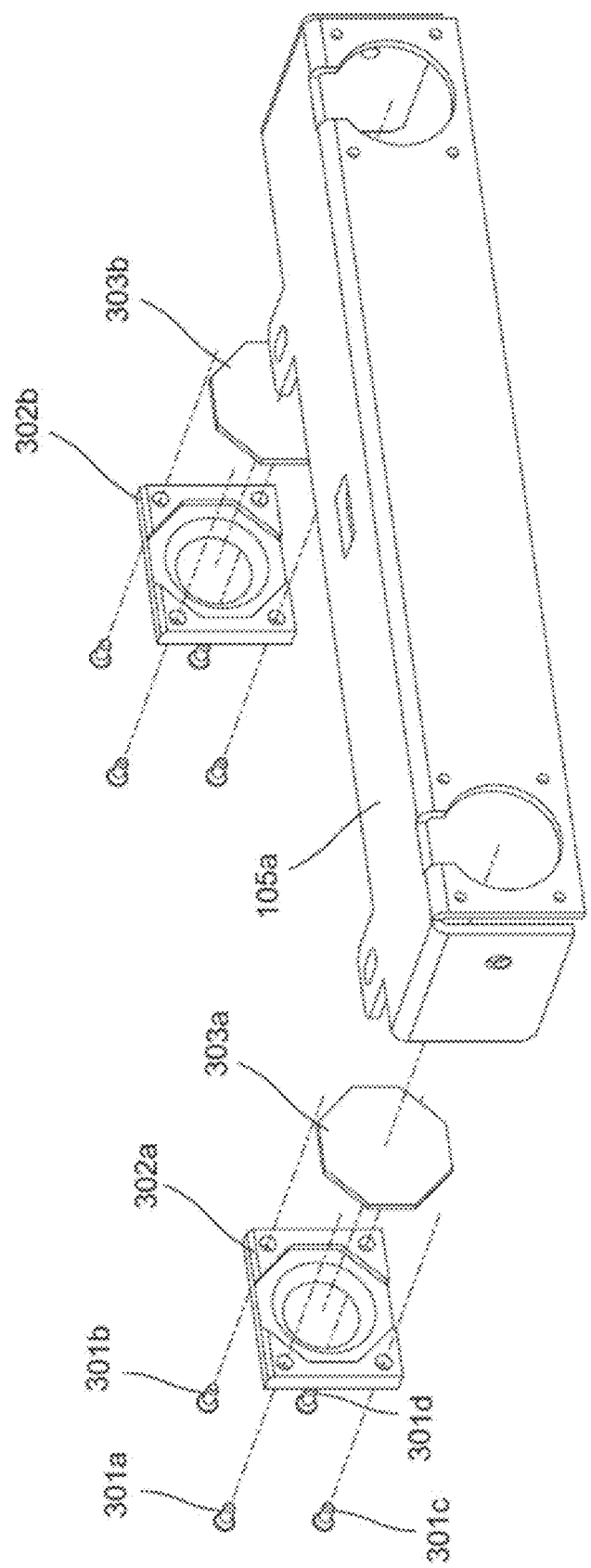
FIG. 3 is an exploded rendering of an enclosure of the imaging apparatus of FIG. 1.

FIG. 2 is a rendering of an external perspective view of an imaging system 100 comprising an imager 105, according to some embodiments. FIG. 3 is an exploded rendering of an enclosure of the imaging system of FIG. 2, showing a housing top portion 105a and two protective glass windows 303a, 303b are positioned between the housing top portion 105a and their corresponding mounts 302a and 302b, respectively. Mount 302a is secured to the housing top portion 105a by way of mounting screws 301a-301d or other suitable fasteners (with corresponding mounting screws, not labelled, for mount 302b). In some embodiments, the overall dimensions of the imaging system are about 180×36×24 mm, and/or the baseline distance between apertures of the receiver and the transmitter is about 136 mm.

Figure 4:
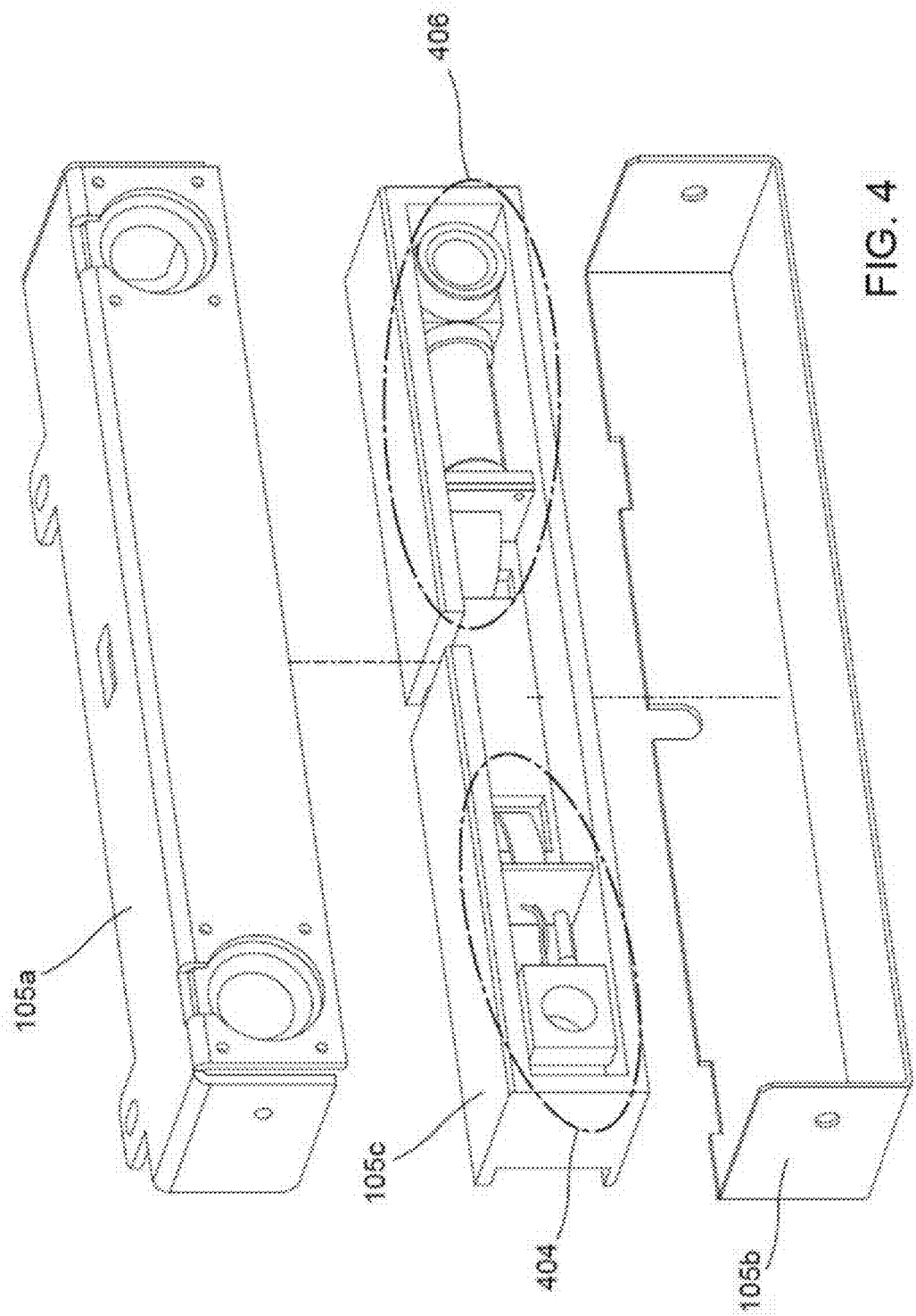
FIG. 4 is a rendering of the imaging apparatus of FIG. 1 in a partially disassembled state.

FIG. 4 is a rendering of the imaging system of FIG. 2 in a partially disassembled state. As shown, a housing top portion 105a and a housing bottom portion 105b are provided, along with a main mounting bracket 105c. In some embodiments, the main mounting bracket 105c is thermally conductive to distribute heat. Also shown are transmitter assembly 404 (discussed in greater detail with respect to FIGS. 5 and 6) and receiver assembly 406 (discussed in greater detail with respect to FIGS. 5, 7, and 8).

Figure 5:
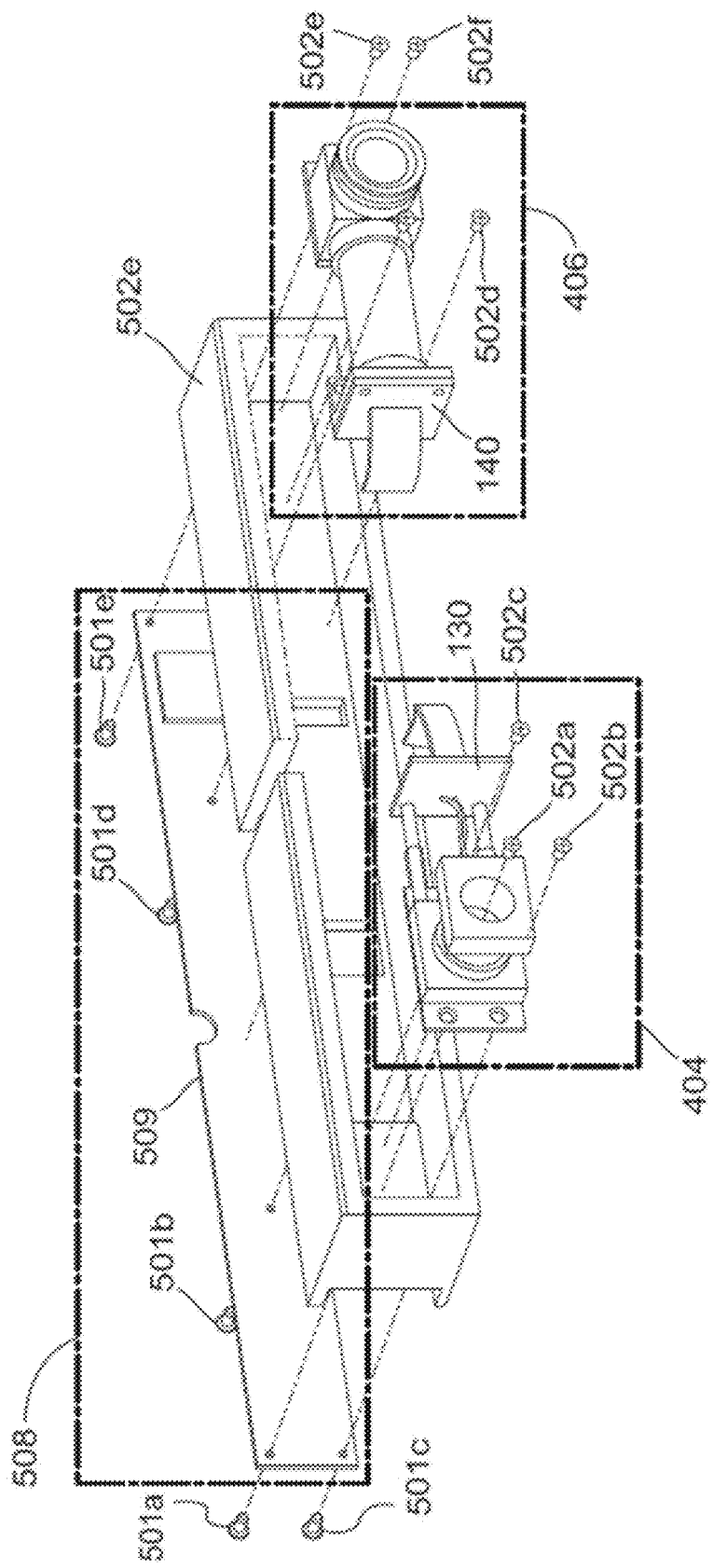
FIG. 5 is a rendering of the imaging apparatus of FIG. 1, showing a processor assembly, a transmitter assembly and a receiver assembly.

FIG. 5 is a rendering of the imaging system of FIG. 2, showing a processor assembly 508, a transmitter assembly 404, and a receiver assembly 406. As shown, the processor assembly 508 includes an electronics printed circuit board 509 and is secured, during assembly, to the main mounting bracket 105c via mounting screws 501a-e and/or other suitable fasteners. The processor ("PX") can be disposed on the electronics printed circuit board 509 and comprises a central processor unit having one or more cores, a field-programmable gate array (FPGA), a single-board computer with general purpose graphics processor unit (GPGPU) acceleration, and/or an application-specific integrated circuit (ASIC). The transmitter assembly 404 may include the temporal modulator 130 and can be secured, during assembly, to the main mounting bracket 105c via mounting screws 502a-c and/or other suitable fasteners. The receiver assembly 40g includes the image sensor 140 and is secured, during assembly, to the main mounting bracket 105c via mounting screws 502d-f and/or other suitable fasteners.

Transmitter Assembly

Figure 6:
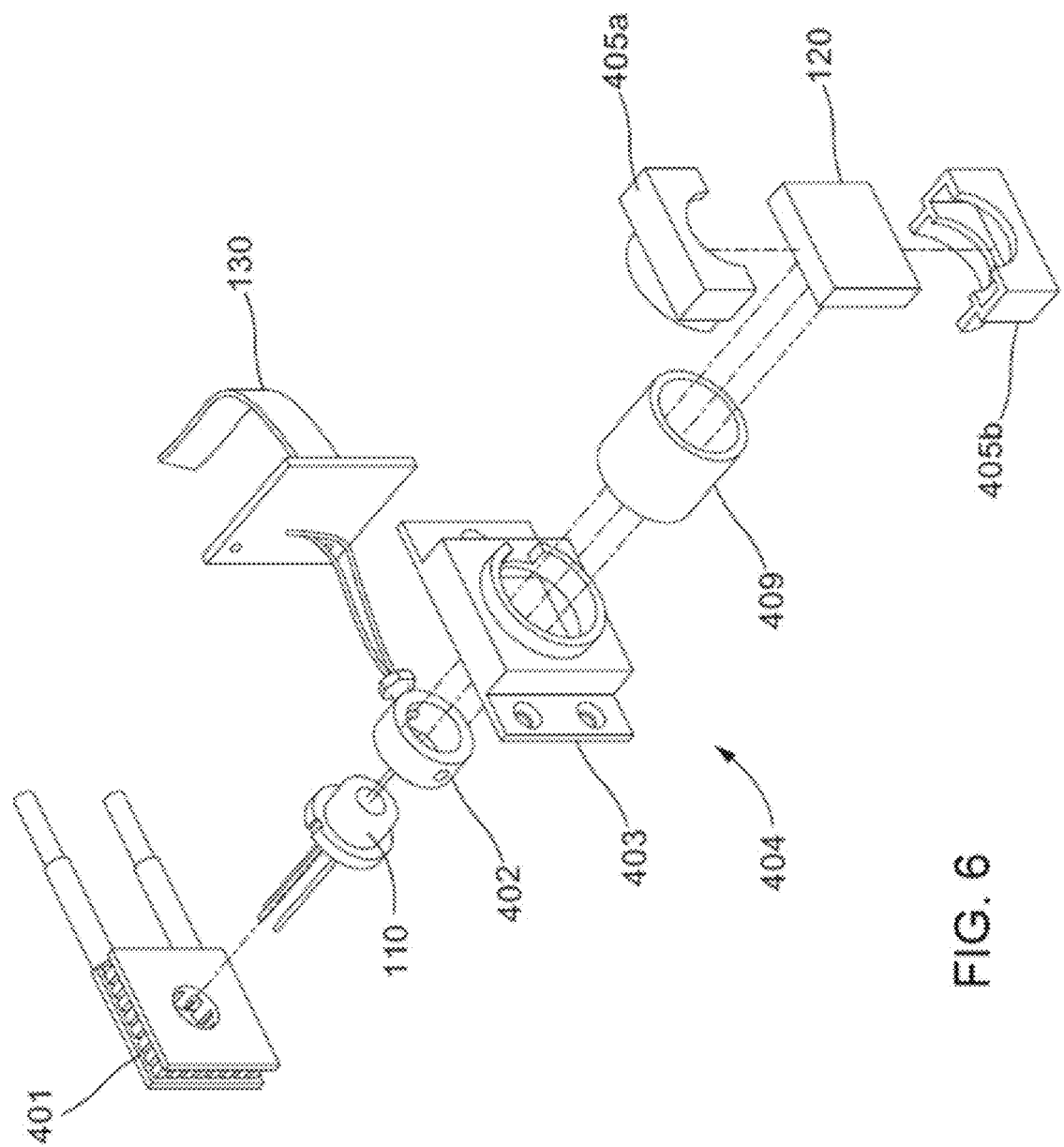
FIG. 6 is a rendering of the transmitter assembly of FIG. 5, in a partially disassembled state, showing a laser diode, a temporal modulator and a spatial modulator.

FIG. 6 is a rendering of the transmitter assembly 404 of FIG. 5, in a partially disassembled state, showing a thermoelectric cooler 401, a laser source 110 (shown here as a laser diode), a ring mount 402 for the laser source 110, a temporal modulator 130 electrically coupled to the ring mount 402, a collimation tube mount 403, a collimation tube 409, and a spatial modulator 120 (e.g., a diffractive optical element, "DOE") disposed between first and second mount portions (405a, 405b). In some embodiments, a transmitter assembly 404 of the present disclosure includes one or more of a lens protector, a thermistor (e.g., to sense temperature), a thermoelectric cooler ("TEC"), and a temperature controller (e.g., to prevent overheating of the transmitter).

In operation, the transmit laser and receive filter can vary in central wavelength based on temperature due to variations in element spacing and interference cavity thickness, respectively, due to thermal shift. Additionally, the receive array can suffer from a condition known as pixel shift in which the array appears to translate slightly, should the temperature of the array itself vary significantly over the course of operation. In some embodiments, the temperature controller allows for precision wavelength tuning on the transmit and/or receive optics. The TEC can keep the laser in tune with the rest of the receiver optical system (wherever it may drift), in some embodiments eliminating the need to match the receiver back to the laser. The optics can be housed in a thermally-insulating plastic casing, for example to minimize the power needed to stabilize the diode temperature.

In some embodiments, the temporal modulator 130 comprises a switching power supply (a.k.a., laser power driver) or a mechanically actuated mechanism (e.g., a shutter) to modulate the amplitude of the transmit beam. Temporal modulation can be accomplished via a variety of methods, including but not limited to: (1) rapidly switching the power supply of the laser using a variable laser power driver (e.g., to modulate the current, voltage or both, of a primary lasing medium (if using a single stage laser), a gain medium (if using an amplified laser), or both); (2) maintaining the beam at a constant power level, but modulating the output by either absorbing or redirecting the exiting beam (e.g., mechanically shuttering the output aperture to absorb the laser beam before it leaves the device, or electronically shuttering the beam by having the beam pass through either an electro-optic, liquid crystal, or polarization dependent region and electromagnetically altering the region's complex index of refraction to cause absorption or deflection of the beam within that medium); and/or (3) using an acousto-optic modulator or mechanical mirror to redirect the beam into a separate but internal beam-dump or thermally isolated absorption region, for example, to prevent some or all of the beam from exiting the transmitter. Acousto-optic and mechanical beam deflection can modulate the beam at higher speeds, higher power levels, or both than other techniques since the absorption can occur over a region larger than the output aperture.

In some embodiments, the spatial modulator 120 is a diffraction grating configured to project a pattern of spots. To project a pattern of spots of wavelength of λ with an inter-spot distance of l at a distance D from the grating, the grating should have slits of spacing d where $$d = \frac{n*\lambda*D}{l}$$

where n is any integer greater than or equal to 0, which corresponds to the order of the diffraction. The spacing between spots l will be in the same direction as the spacing between the slits d. In other words, the spots are diffracted in the direction of the grating vector. In some embodiments, the diffraction grating is a fixed optical component that produces substantially constant spatial modulation. The diffraction grating's pattern can be adjusted by heating or cooling the grating or varying the wavelength of the incident light. In other embodiments, the diffraction grating is a deformable optical surface such as a micro-electromechanical system deformable micro-mirror device ("MEMS DMD").

To generate spots in two dimensions, multiple gratings can be layered, allowing the exiting beams from the prior grating to become the incident beams for the next. (Alternatively, the system may employ a single grating that is patterned with a two-dimensional grating pattern.) Succeeding gratings do not require slit spacing to be uniform or their direction to be parallel. Accordingly, complex, asymmetric, two-dimensional patterns can be generated using this technique.

In some embodiments, a pattern of spots comprises a plurality of "light spots" and a plurality of "dark spots." A "light spot" may be defined as a portion of the image in which the projected signal has an amplitude greater that of the surrounding region. In the absence of background, all sections of the image are filled by either light or dark regions. In general, regions of positive interference are light spots. These correspond to regions where the optical path length between the grating and the spot is an integer number of wavelengths of the incident light. Regions that are ½ integer number of wavelengths correspond to negative interference and be considered dark spots. A "dark spot" simply indicates that no light from the signal is in that region; background light may still be present. Destructive interference regions (i.e., dark spots) only indicate that no signal is present; they do not diminish the background. To calculate the density of light spots, based on grating slit separation, distance from the grating, and wavelength of the incident light, consider the following equations:

n=1, 2, 3 . . .

λ=wavelength of incident light

θ=angle of bright spot d=separation of slits l=separation of spots $l = D*\sin(\theta)$ $$\sin(\theta) = \frac{n*\lambda}{d}$$

$$l = \frac{D*n*\lambda}{d}$$

$$\delta = \frac{\# \text{ slits}}{\text{meter}} = \frac{1}{d}$$

$l = D*n*\lambda*\delta$ $$\rho = \frac{\# \text{ spots}}{\text{meter}} = \frac{1}{l}$$

∴ therefore the number of spots per meter at a distance D of order n from an incident beam of wavelength λ passing through a grating with δ slits per meter is:

$$\rho_n = \frac{1}{D*n*\lambda*\delta}$$

with the total number of spots per meter being:

$$\rho_T = \sum_{n=1}^{T} \frac{1}{D*n*\lambda*\delta}$$

with T being the maximum order visible above background as set by the limits of the transmitter power, background and receiver sensitivity In some embodiments, the transmitter illuminates a scene with a pattern of spots having multi-level illumination (e.g., 10 levels instead of on/off) or having a phase-modulated pattern (i.e., multiple "static" levels, and/or multiple-level temporal variation), for example, using a diffractive or refractive optic (e.g., a phase retarding optic or a specially designed DOE). In the case of single-layer or multiple-layer diffractive optics, the diffraction order (order 1, 2, 3, etc.) of each spot can have progressively less power than the last. Such regions may still be considered to be "light" or "dark," e.g., depending on whether they are areas of constructive or destructive interference, and can be distinguishable from one another by varying degrees, for example depending upon the illumination gradient.

Receiver Assembly

Figure 7:
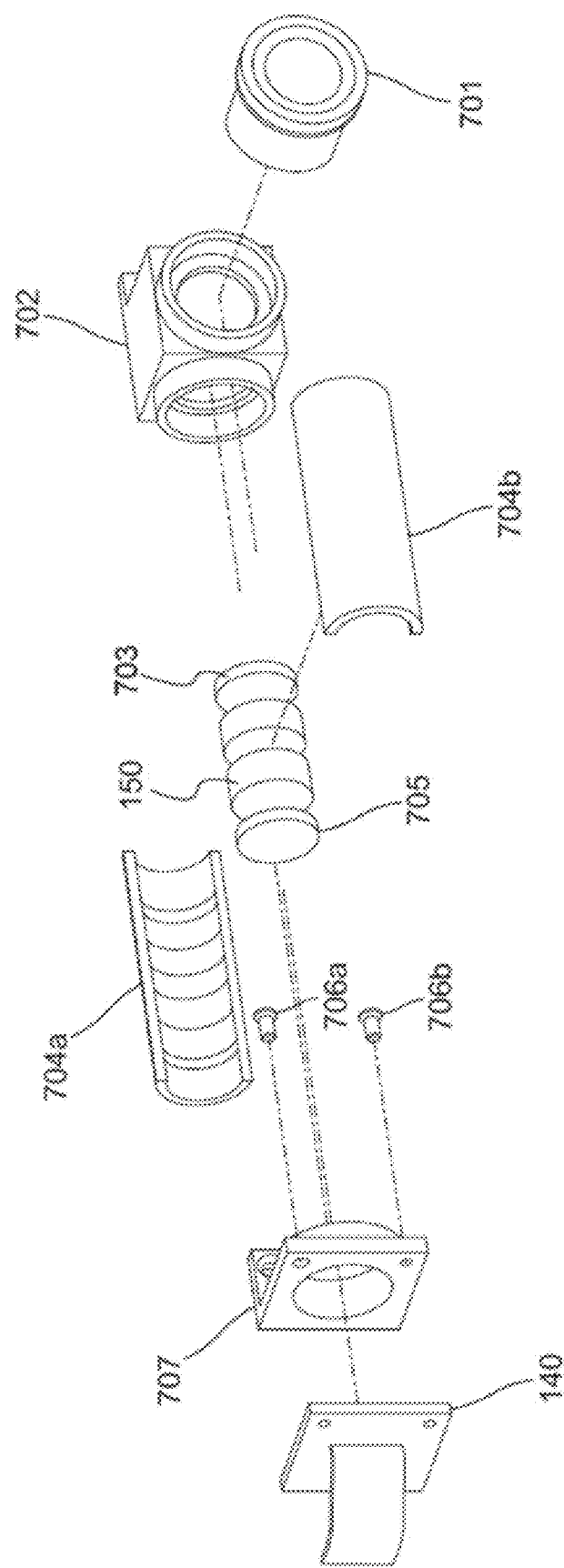
FIG. 7 is an exploded perspective view of the receiver assembly of FIG. 5, in a partially disassembled state, showing an objective lens, a right-angle mirror, a collimating lens, a band-pass filter, a focusing lens, and an image sensor.

FIG. 7 is an exploded perspective view of the receiver assembly of FIG. 5, in a partially disassembled state, showing an objective lens 701, a right-angle mirror 702, a collimating lens 703, the band-pass filter 150, a focusing lens 705, a receiver optics tube (split into halves 704a and 704b), a mounting bracket 707 for the image sensor, and the image sensor 140. In some embodiments, a receiver assembly comprises one or more lens protectors, for example, housed in a plastic casing to prevent stray light and for ease of mass production. In some embodiments, the monochrome image sensor 140 is replaced by a digital focal plane array (DFPA), a Geiger-mode avalanche photodiode ("APD") array, an APD array, a charge-coupled device (CCD), an intensified charge-coupled device ("ICCD"), an electron-multiplying CCD ("EmCCD"), a complementary metal-oxide semiconductor ("CMOS") digital image sensor (e.g., an Aptina MT9M031), or any other suitable device. In some embodiments, the optical elements (e.g., lenses) can be modified, rearranged, and/or augmented or replaced with other components as understood in the art. The various lenses and their relative placement can be adapted to modify the system external field of view, angle of incidence of light rays through the band-pass filter, image sensor size, and/or optical path length. Additional lenses may be added to correct for aberrations.

In some embodiments, the band-pass filter 150 is configured to reduce background light, and comprises a 1 nm full-width at half-max (FWHM) filter. Typically, filters of this narrow line-width are used as "laser line filters." These come in a standard size of ½-inch (12.7 mm). One potential issue with such a tight wavelength band-pass filter is the lower angle of acceptance; ideally, all beams entering this element are collimated (angle of incidence zero), although in practice the beams may be only substantially or partially collimated. To achieve a telecentric region—i.e., a region in which the chief rays are parallel to the optical axis in object and/or image space—in the optical path without sacrificing image quality, more lens elements and thus a longer optical path can be used. For example, this longer optical path can be achieved by using the long axis of the imager as the main path, a right-angle "turn mirror" to rotate the view onto the scene, and an exterior lens to achieve the desired field of view (FOV) on the scene.

Figure 8:
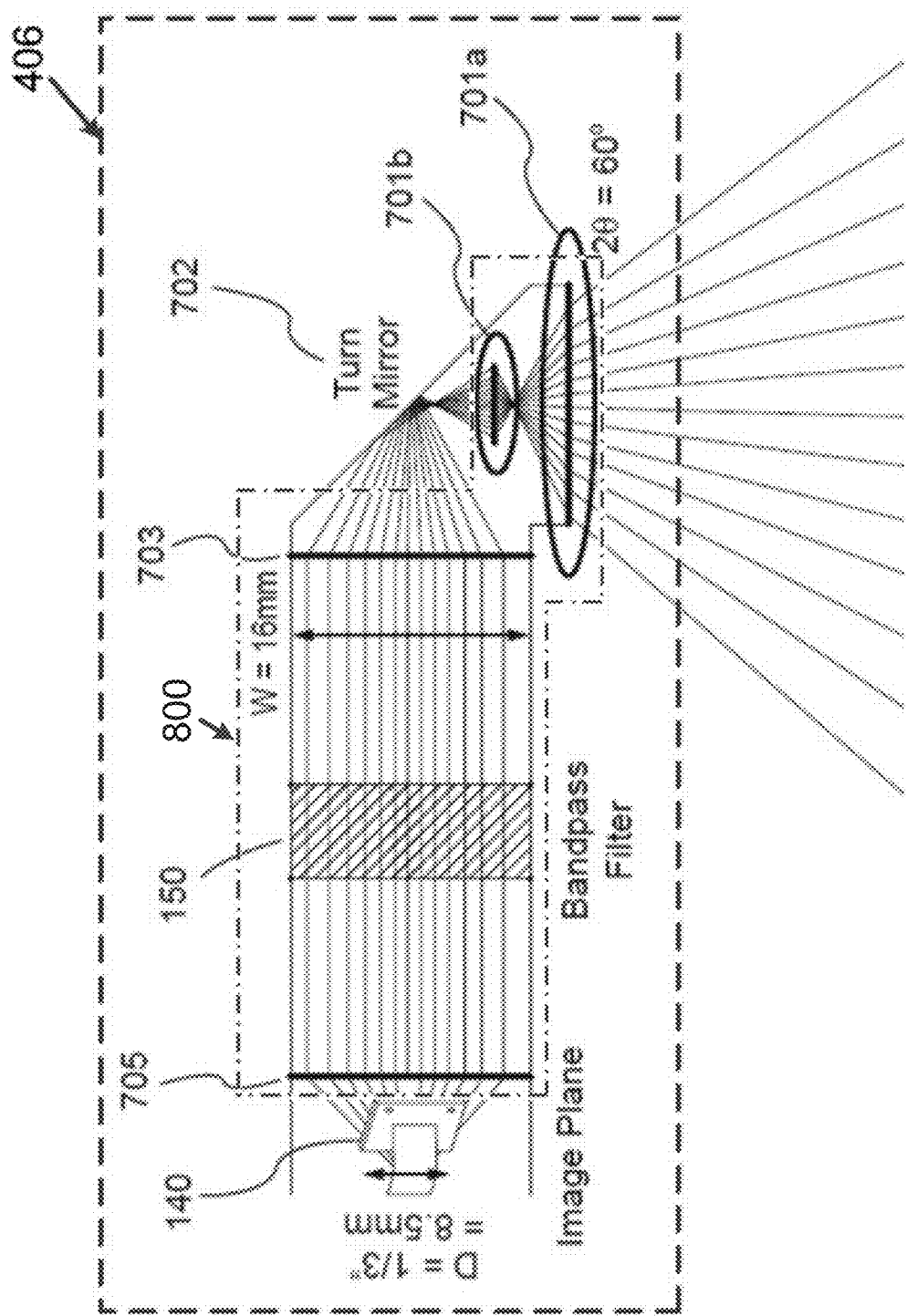
FIG. 8 is a ray diagram showing the transmission of light through optical elements in a receiver of the disclosure, according to some embodiments.

FIG. 8 is a ray diagram showing the transmission of light through optical elements in a receiver assembly 406 of the disclosure. A lens stack 800 of the receiver assembly 406 comprises an exterior objective lens 701a to give a FOV on the scene, a bi-convex lens 701b to extend the focal length and pass through the turn mirror enclosure 702, a plano-convex lens 703 to create a substantially collimated region of light rays (a telecentric region), a band-pass filter 150 to filter out background light not matching the wavelength of the laser source, and a final de-collimating plano-convex lens 705 to focus the rays onto the image plane of the image sensor 140. One advantage of having collimated light pass through the band-pass filter is that it allows a much narrower spectral width for the filter, rejecting more of the background light while still passing substantially all of the projected light.

Imaging of a Scene

FIG. 9A is a perspective photograph of an imaging apparatus, according to some embodiments. Transmitter assembly 901 includes a laser diode, collimating optics, a diffractive optical element (e.g., a DOE/spatial modulator), and pattern conditioning optics. Light from the transmitter assembly 901 passes through a transmitter optical assembly 902, comprising a set of corrective optics that size and focus the transmitted pattern to an appropriate range. The light is then projected onto a target scene 125 (see FIG. 9B), illuminating it. FIG. 9C shows a signal image of the scene 125, recovered by digitally coherent detection, comprising the transmitted pattern as projected onto the scene shown in FIG. 9B. FIG. 9D is a side view of the imaging apparatus of FIG. 9A, showing a digital coherent processing unit ("DCPU") 902, the transmitter assembly 901, the spatial modulator 902, and the receiver 903. Receive optics in the receiver 903 may include the received beam optical assembly, an optical conditioning and filtering path in the telecentric region of the lens (which is present in the conical region between the large lens and camera), and a machine vision camera serving as the imaging array. The machine vision camera can implement on-board processing, temporal filtering, and signal synchronization, which allow for the implementation of the digitally coherent processing algorithm before the image is passed to the DCPU.

Viewpoint-Invariant and Pseudo-Random Structured Light Patterns

Figure 10B:
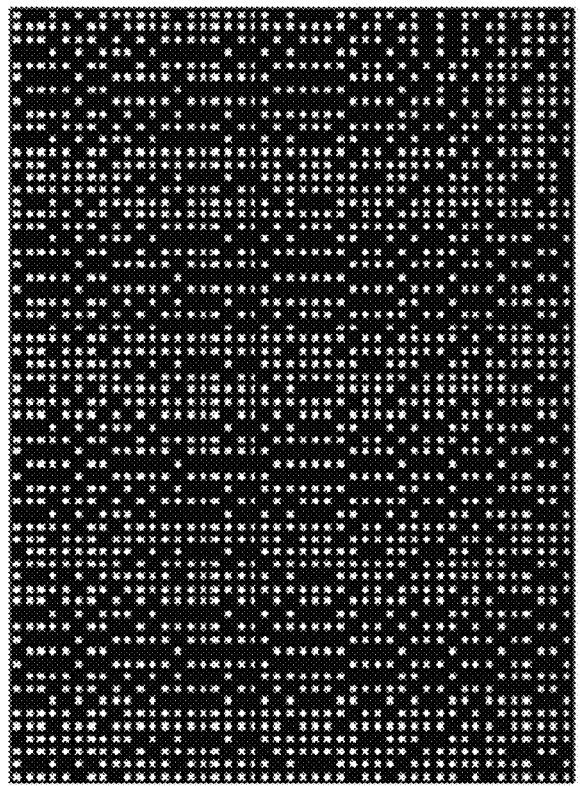
FIGS. 10A and 10B are exemplary illumination patterns of the disclosure, according to some embodiments.
Figure 10A:
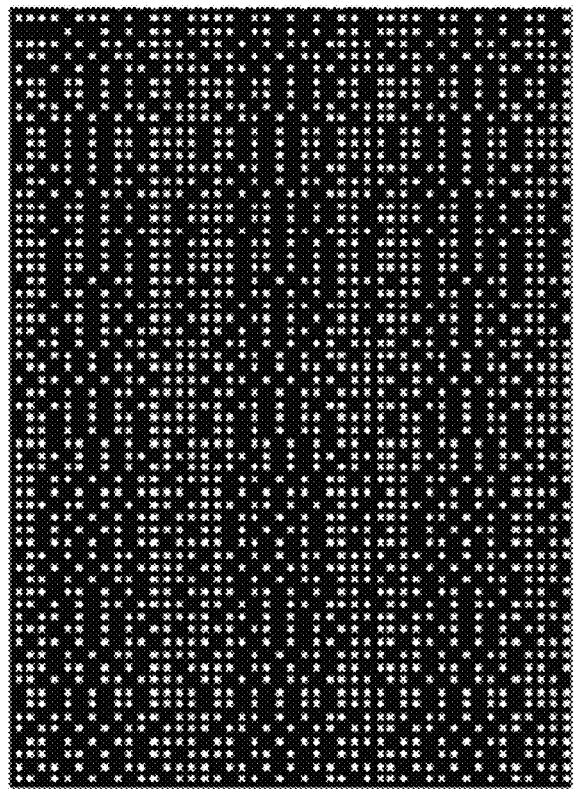

FIGS. 10A and 10B are exemplary illumination patterns suitable for projection by a SLiDAR system. The patterns are composed of a large number of single-image, uniquely identifiable regions composed of light and dark spots. Both the number and the properties of those uniquely identifiable regions can be predetermined. Patterns can be generated as follows: the image domain is partitioned into a discrete grid of a number of sub-windows, with each sub-window comprising a number of pixels. Instances of sub-windows are randomly generated in sequence, and a feature descriptor vector is computed for each sub-window. If a new instance's descriptor lies too close to an existing one in the feature space (e.g., if their Euclidean distance is below a threshold), then the new instance is rejected. This process proceeds until all sub-windows are instantiated with values that are sufficiently distant in the feature space. Patterns may then be repeated vertically or horizontally to extend the image size, albeit not extending the unambiguous set of sub-windows.

In some embodiments, each region is a randomly generated set of spots for which a feature descriptor vector is mathematically generated (e.g., based on one or more image metrics, such as relative contrast, periodicity, number of rotationally invariant regions, etc.). The uniqueness of the feature descriptor vector indicates how distinguishable a region may be from other regions. After a first region and its associated feature descriptor vector is generated, a further region (also comprising a randomly generated set of points) and associated feature descriptor vector are generated. If the further feature descriptor vector is too close to the previous feature descriptor vector (e.g., an overlap of the previous feature descriptor vector with the further feature descriptor is unacceptably large), it is discarded, and a new region and feature descriptor vector are generated. This process can be repeated iteratively until all regions, with sufficiently distinct feature descriptor vectors, are generated. The regions are then combined by assembling them into a grid pattern, resulting in a pseudo random image. It is then possible to observe any small piece of the pseudo random image and identify which of the unique regions are present there.

Figure 11:
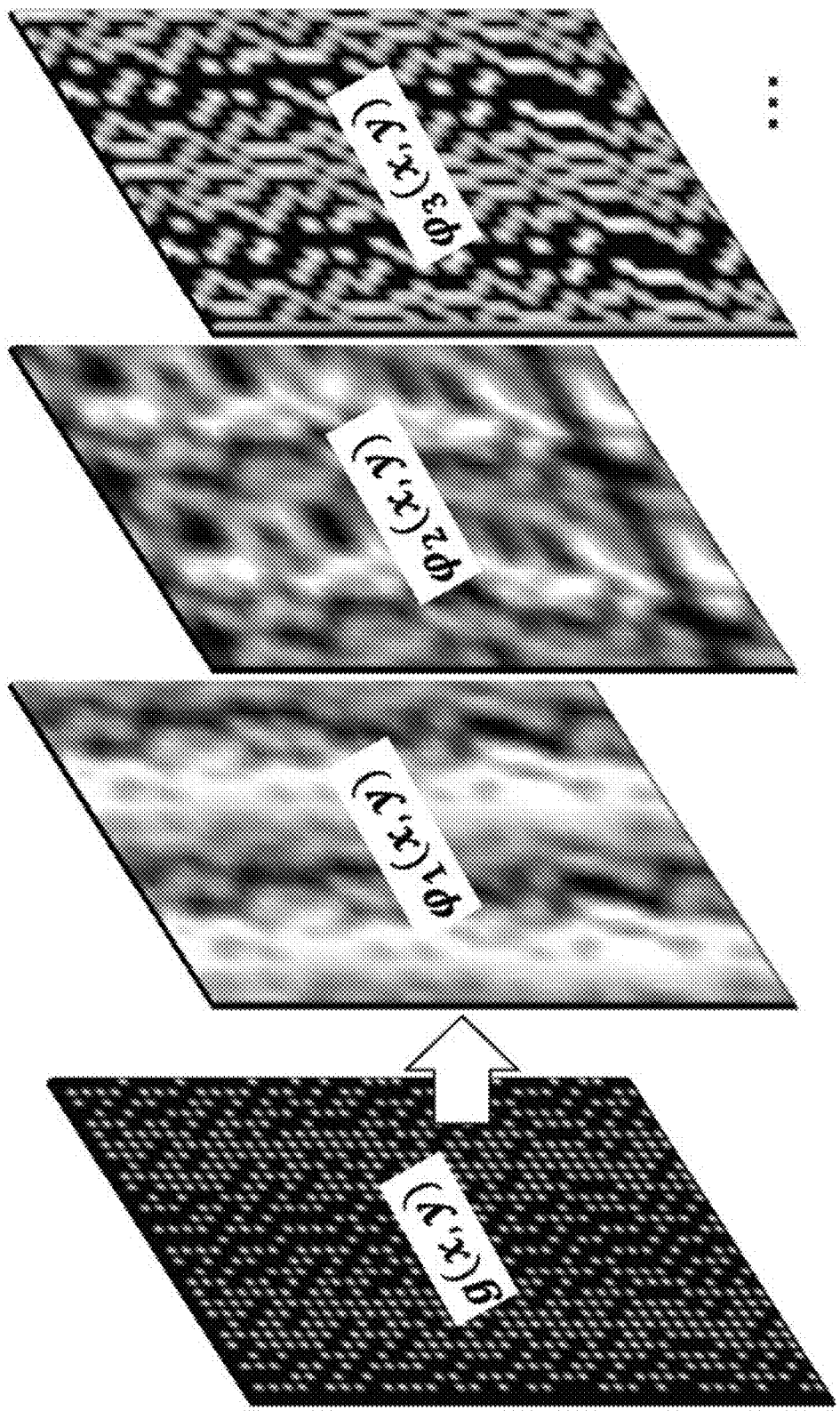
FIG. 11 is a visualization of multi-dimensional feature space, in which each pixel is associated with a feature descriptor computed from the original image, according to some embodiments.

FIG. 11 shows a visualization of multi-dimensional feature space in which each pixel (x,y) is associated with a feature descriptor $\phi(x,y)$ computed from the original image g(x,y). The images $\phi_1(x,y)$, $\phi_2(x,y)$, $\phi_3(x,y)$, etc. are each particular slices of the feature descriptor vector described above. Each pixel per plane corresponds to one score of one feature of one region. The particular feature descriptor shown is Affine Scale-Invariant Feature Transform (ASIFT), which is invariant to perspective projections of the image as would result from viewing the scene from different viewpoints. Each region is scored based on how well it can be distinguished from the others relative to scale and rotation changes. Higher scores are assigned to regions that remain uniquely identifiable, in spite of whether or how the scene is rotated or zoomed (i.e., those transformations do not affect the uniqueness of the subregions).

In some embodiments, each sub-region of the pseudo-random, two-dimensional pattern exhibits the property that each sub-window (for example, a square window containing at least 3×3 pixels) has a unique encoding that distinguishes it from other sub-window locations. The unique encoding can be defined by computing a vector-valued feature descriptor using a functional transformation that is invariant to perspective projections of the input window as would result from viewing the scene from different viewpoints. Furthermore, also included are replications of such a pattern forming a larger pattern, in which sub-windows would only be locally unique in order to sufficiently disambiguate sub-window locations when combined with other prior knowledge of the scene.

Figure 12:
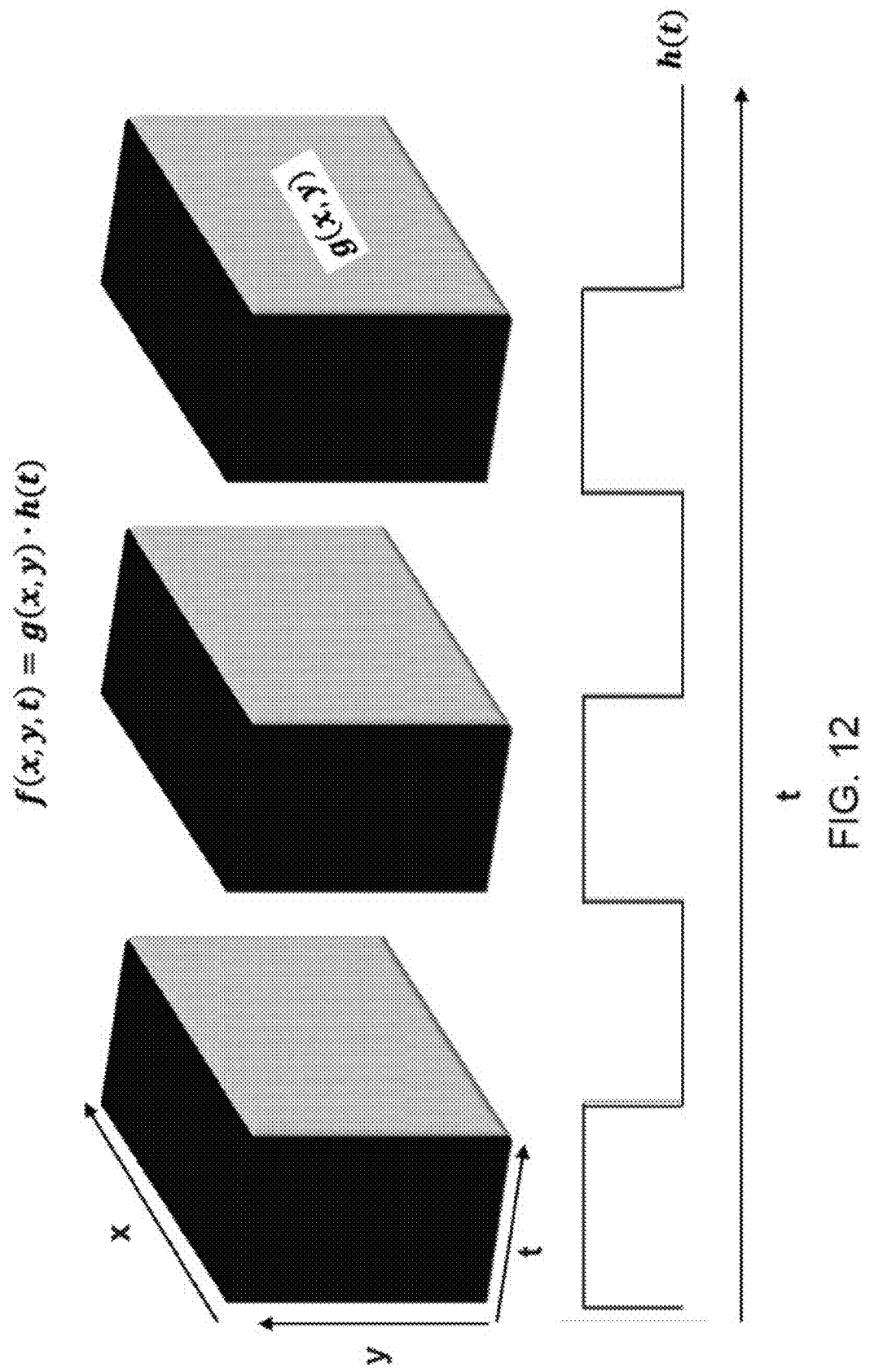
FIG. 12 is a graphical representation of space/time modulation of an illumination source of an imaging apparatus of the disclosure, according to some embodiments.

FIG. 12 is a graphical representation of space/time modulation of an illumination source of an imaging apparatus of the disclosure, according to some embodiments. It shows a notional pattern formed by orthogonal space-time modulation. The spatial pattern, g(x,y), multiplied by the temporal modulation pattern, h(t), yields the overall space-time pattern(x,y,t). This image shows the global modulation of the scene as a function of time in the "all on"/"all off" mode of operation.

Figure 13:
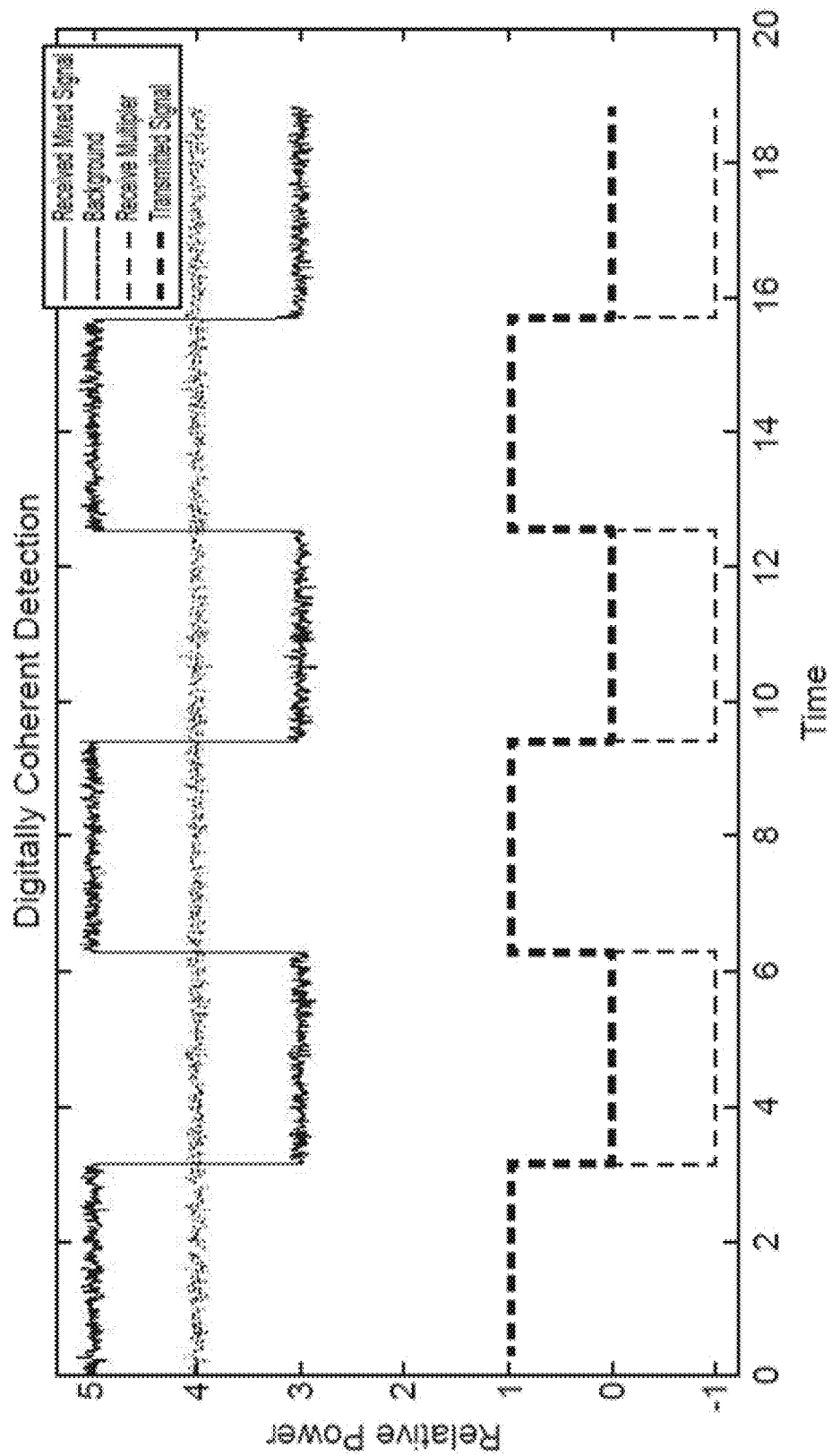
FIG. 13 is a graph of a transmitted signal, a received mixed signal, a background signal, and a receive multiplier signal, illustrating digitally coherent detection performed by an imaging apparatus of the disclosure, according to some embodiments.

FIG. 13 illustrates digitally coherent detection performed by an imaging apparatus of the disclosure, according to some embodiments. In particular, FIG. 13 is a graph of a transmitted signal (dot-dashed line), a received mixed signal (solid line), a background signal (dotted line), and a receive multiplier signal (dashed line). As shown, temporal modulation is used to distinguish a weak signal (amplitude 1) from a strong background (mean amplitude 4). The period of the waveform is 2 frames. During temporal modulation, a frame is captured with the laser off and its value(s) is (are) multiplied by −1. A frame is then captured with the laser on, and its value(s) multiplied by +1. This is performed iteratively (e.g., for K frames), and the values are summed. The result is an image with a substantially higher signal to background ratio than could be achieved by a conventional imaging method using the same power.

As shown in FIG. 13, the relative and constant amplitude of the background light is 4. The transmitter is able to broadcast at relative units of between 3 and 5, alternating. Without any digital coherence, this results in the signal being 1 unit above the background 50% of the time and the signal being 1 unit below the background 50% of the time. For standard detection techniques this would result in a 'grey' image in which the signal had exactly the same integrated strength as the background and was completely indistinguishable. As shown by the receive multiplier signal waveform, a receiver multiplier term is digitally applied, using the exact same signal and background. This term is synchronous with the transmitter such that it adds the values of measurements received when the transmitter is turned on and subtracts the values of measurements received when the transmitter is turned off. This can be seen by the 'Receiver Multiplier' line going from +1 (meaning addition) to −1 (meaning subtraction) in synchronization with the transmitted signal. The result is shown as the 'Received Mixed Signal' line, which indicates what the received signal is when performed using this digitally coherent technique. The result is that the receiver now records signal at or above the background in every frame, resulting in an image with a distinct signal over background. This signal can be made larger by integrating over more frames and/or can allow a signal of the same strength to be collected under much brighter background conditions. One can see that the receiver multiplier is modulated with the same frequency and phase as the transmitted signal, hence the moniker of "coherent detection." The recovered signal is given by $\hat{g}(x,y)=\int_t h(t)\cdot(g'(x,y,t)+b(x,y,t))dt$, where h(t) is the temporal modulation function, b(x,y,t) is the background illumination, and g'(x,y,t) is the image of the projected signal on the scene as seen by the camera. In particular, a square wave is pictured for h(t), corresponding to the background subtraction process described in the next section.

Background Subtraction and Image Processing

Background subtraction can increase the visibility of the modulated light field, better enable detection of distortions in the modulated light field relative to the expected, calibrated field, and/or allow for the imaging of a scene under sunlit conditions. In some embodiments, background subtraction comprises acquiring at least one image of a scene while the scene is illuminated with spatially modulated light, acquiring at least one background image of the scene when it is not illuminated with the spatially modulated light, and subtracting at least a portion of the background image of the scene from the image of the illuminated scene. Embodiments of the present disclosure use a temporally and spatially modulated transmit path to capture the full frame, and perform full frame subtraction to extract the signal. The temporal modulation can be orthogonal to the spatial modulation. Background subtraction can be used with other stereo vision triangulation techniques to estimate the range to each region.

In some embodiments, image processing comprises acquiring an image of a region of a projected pattern, removing background light (e.g., by background subtraction) to ensure the best identification of that pattern, and then using the measured 2D disparity from a known reference scene and known geometry of the projector and detector to estimate the range. Although the net effect is mean(A)−mean(B), the implementation is mean($A_r-B_t$); such interleaved subtraction allows improved dynamic range and reduced readout data rate—a technique which may be referred to as "Digitally Coherent Detection." In some embodiments, background subtraction and multi-frame averaging are used for sunlight operations in human accessible environments. In some cases, one or more of the following is also used: (1) choose an appropriate laser wavelength and matched optical filter to eliminate out-of-band light, and have an optical path that supports the inclusion of such a filter; (2) temporally modulate the signal such that the exposure time per region is maximized enough to capture signal but minimized enough to reduce contributions from a lit background environment; (3) operate at high optical powers (e.g., 1-2 W, up to 10 W, average power/continuous wave) under constant illumination (e.g., for embodiments where eye-safety requirements are not a consideration; e.g., environments inaccessible to humans); and/or (4) modulate the transmitted laser beam in a manner matched to the receiver.

Experimental Demonstration

FIGS. 14A-14F show a progression of images acquired by an imaging apparatus of the disclosure, showing background subtraction, temporal integration, and white balancing. FIG. 14A is an image of a laser-illuminated night scene. FIG. 14B is an image of the night scene of FIG. 14A, but without laser illumination (i.e., "background"). The background image of FIG. 14B is subtracted from the image of the laser-illuminated scene of FIG. 14A, to create a scene-distorted signal (FIG. 14C). Temporal integration of the image of FIG. 14C yields the boosted signal image of FIG. 14E. FIGS. 14D and 14F show further processed images of the scene-distorted signal and the boosted signal, respectively, after white balancing has been performed.

Due to temporal modulation of the laser source, alternating frames from the detector are alternatingly added (when source is on) then subtracted (when source is off) from a cumulative total, which may be maintained on a per-pixel basis using in-pixel computation or using external computation after image readout, in order to accomplish background subtraction. This process is done at a much higher rate than the depth image is produced, so that ultimately the 2D image being fed into the depth estimation process is a high-dynamic-range quantization centered around the source illumination intensity. The subtraction of background can boost the signal and, correspondingly, the maximum range of the imager. FIG. 15A is a photograph of a scene containing a 3D structure that is illuminated by a projected pattern transmitted from an imaging apparatus. FIG. 15B shows a reference image stored in a memory of the imaging apparatus of FIG. 15A, and FIG. 15C shows a scene-distorted image collected at a receiver of the imaging apparatus of FIG. 15A after illumination of the structured scene of FIG. 15A. Comparing the reference image of the pattern on a flat scene, one can see that the projected pattern has been distorted by the 3D scene geometry. Since this distortion is related to the scene depth in a known way, this conventional 2D image of the illuminated scene can be used to infer a 3D depth image by processing algorithms that compare it to the reference image. In other words, the three-dimensional image is generated through comparison of the scene-distorted image (e.g., after removal of background, as described herein) with the reference image.

Figure 16:
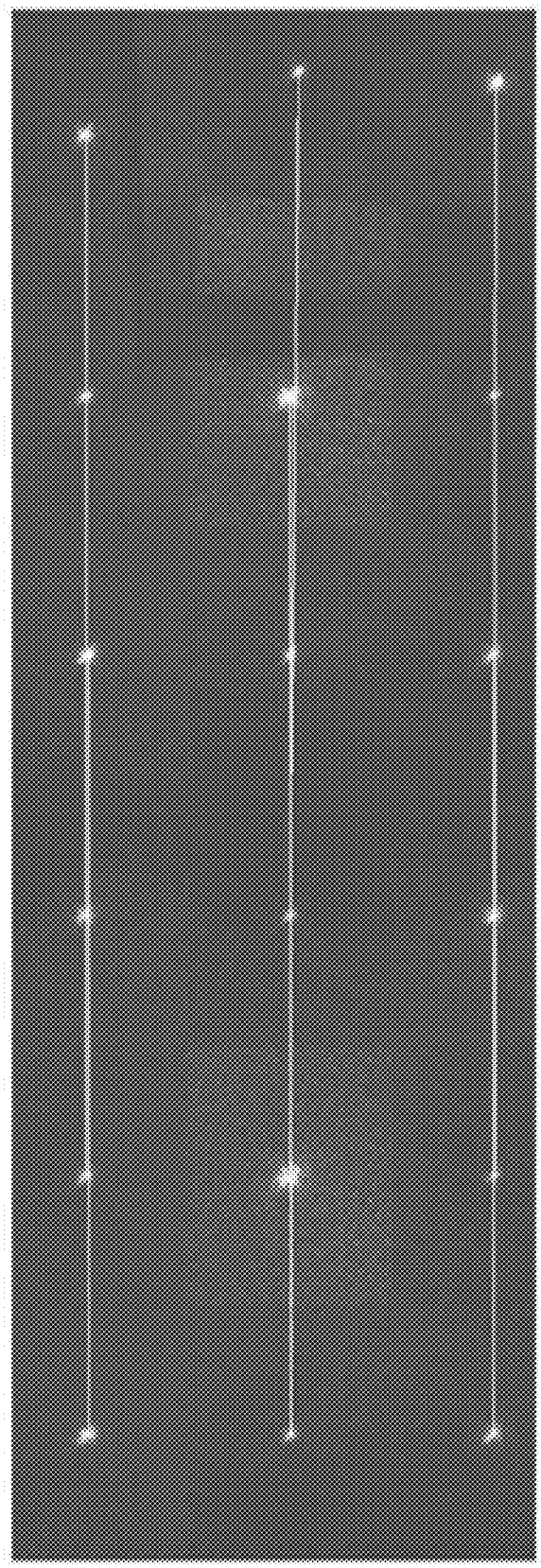
FIG. 16 shows the axis-aligned corresponding points between the reference image of FIG. 15B and the scene-distorted image of FIG. 15C, performed by a processor of the imaging apparatus of FIG. 15A.

FIG. 16 shows the axis-aligned corresponding points between the reference image of FIG. 15B and the scene-distorted image of FIG. 15C, performed by a processor of the imaging apparatus of FIG. 15A. This alignment into horizontal lines of corresponding points between the reference image and the scene-distorted image is referred to as "image rectification." Image Rectification can comprise warping the query image into the image plane domain of the reference image (or vice-versa). "In some embodiments, the source and the detector are aligned in an epipolar geometry, so that this warping is a homography (linear in homogeneous pixel coordinates). In this case, a uni-dimensional, axis-aligned search can be performed in time linear in the image width to find matching sub-regions.

If the imager (also referred to herein as a "sensor") is mounted on a moving platform or viewing a dynamic scene, motion blur may be induced, reducing intensity image quality and decreasing effectiveness of depth estimation. To mitigate motion blur, image stabilization can be performed, for example, by estimating the apparent motion induced in the intensity image and then shifting the domain of the intensity image to compensate, thereby ensuring that newly added pixel counts are spatially coincident with pixel counts accumulated so far. Estimating the apparent image motion can be implemented on-chip with software techniques that operate on local image patches (e.g., Lucas-Kanade or Horn-Schunk methods), or by hardware techniques (integrating a MEMS gyroscope on-chip). Shifting the image to compensate can be implemented on-chip using local connections between pixels in a systolic array configuration (a digital version of the OTCCD, which may be realized in a DFPA).

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of generating a three-dimensional image of a scene, the method comprising:
    illuminating the scene with a monochromatic beam of light that is:
        (1) spatially modulated with a pseudo-random, two-dimensional pattern; and
        (2) temporally modulated,
    acquiring, with a detector, at least one first image of the scene while the scene is illuminated with the monochromatic beam of light;
    acquiring, with the detector, at least one second image of the scene while the scene is not illuminated with the spatially modulated monochromatic light;
    determining a difference between the at least one first image and the at least one second image; and
    estimating the three-dimensional image of the scene based at least in part on the difference between the at least one first image and the at least one second image.

2. The method according to claim 1, wherein the pseudo-random, two-dimensional pattern comprises a plurality of uniquely identifiable regions.

3. The method according to claim 2, wherein each of the plurality of uniquely identifiable regions comprises a plurality of light spots and a plurality of dark spots.

4. The method according to claim 2, wherein each said of the plurality of uniquely identifiable regions is defined by computing a vector-valued feature descriptor using a functional transformation that is invariant to perspective projections of the at least one first image when viewed from different viewpoints.

5. The method according to claim 1, comprising incrementing a count when the at least one first image is acquired and decrementing the count when the at least one second images is acquired, to determine the difference between the at least one first image and the at least one second image.

6. The method according to claim 1, further comprising interleaved subtraction of a plurality of first images and a plurality of second images to increase a signal-to-noise ratio at the detector to a level sufficient for imaging the scene under sunlit conditions.

7. The method according to claim 1, wherein estimating the three-dimensional image of the scene is further based on a geometric relationship between a course of the spatially modulated monochromatic beam of light and the detector.

8. The method according to claim 1, wherein estimating the three-dimensional image of the scene includes identifying an offset for each pixel of the at least one first image of the scene having a highest correlation between a sub-region of the at least one first image and a corresponding sub-region of a third, reference image.

9. The method according to claim 1, wherein the detector comprises at least one counter operably coupled to at least one pixel in a plurality of pixels, the method further comprising at least one of:
    (1) incrementing a cumulative count of the at least one counter in response to detection of the at least one first image of the scene and decrementing the cumulative count of the at least one counter in response to detection of the at least one second image of the scene;
    (2) identifying a sub-region of the at least one first image of the scene and orienting the sub-region to match a corresponding sub-region of a reference image; or
    (3) estimating an apparent motion in the at least one first image of the scene and shifting a domain of the at least one second image to compensate therefor.

10. The method according to claim 1, further comprising spatially modulating the monochromatic beam of light in synchronization with the temporal modulation.

11. The method according to claim 1, further comprising actuating a shutter of the detector in synchronization with the temporal modulation of the monochromatic beam of light, and alternatingly capturing the first and second images of the scene at the detector.

12. A system to generate a three-dimensional image of a scene, the system comprising:
    a source of optical radiation to illuminate the scene with a monochromatic beam of light;
    a spatial light modulator (SLM), in optical communication with the source of optical radiation, to spatially modulate the monochromatic beam of light with a pseudo-random, two-dimensional pattern so as to form a modulated monochromatic beam of light to illuminate the scene;
    a band-pass optical filter to limit light scattered and/or reflected from the scene to a wavelength of the modulated monochromatic beam of light;
    an image sensor, in optical communication with the band-pass optical filter, to detect a two-dimensional intensity image of the scene at the wavelength of the modulated monochromatic beam of light;
    a temporal modulator, operably coupled to the image sensor and at least one of the source or the SLM, to temporally modulate the monochromatic beam of light and synchronously trigger frame capture by the image sensor; and
    a processor, operably coupled to the image sensor, to estimate a three-dimensional depth image of the scene based on the two-dimensional intensity image of the scene, a stored reference image, and a system calibration parameter representing a geometric arrangement of the system.

13. The system according to claim 12, wherein the source of optical radiation is a laser diode.

14. The system according to claim 12, wherein the SLM comprises at least one a diffractive optical grating, an array of micromirrors, an acousto-optic modulator, a microlens array, a liquid crystal modulator, or an electro-optic modulator.

15. The system according to claim 12, wherein the pseudo-random, two-dimensional pattern exhibits locally unique sub-regions as determined by a projective-invariant encoding.

16. The system according to claim 12, wherein the processor is further configured to
identify a sub-region of the at least one first image of the two-dimensional intensity image and orient the sub-region to match a third, reference image.

17. The system according to claim 12, wherein the processor is further configured to estimate an apparent motion in the two-dimensional intensity image and shift a domain of the two-dimensional intensity image to compensate therefor.

18. The system according to claim 12, wherein the SLM is configured to spatially modulate the monochromatic beam of light in synchronization with temporal modulation of the monochromatic beam of light by the temporal modulator.

19. A system to generate a three-dimensional image of a scene, the system comprising:
a source of time-varying optical radiation to illuminate the scene with a monochromatic beam of light;
a diffractive optical element, in optical communication with the source of time-varying optical radiation, to spatially modulate the monochromatic beam of light with a pseudo-random, two-dimensional, viewpoint-invariant pattern so as to form a modulated monochromatic beam of light to illuminate the scene;
an image sensor to detect a two-dimensional intensity image of the scene at the wavelength of the modulated monochromatic beam of light;
an optical assembly, in optical communication with the image sensor, the optical assembly comprising:
at least one first lens to receive light reflected and/or scattered from the scene;
a collimating lens, in optical communication with the at least one first lens, to collimate at least a portion of the light received by the at least one first lens;
a band-pass optical filter, in optical communication with the collimating lens, to transmit, in a passband of the band-pass filter, the light collimated by the collimating lens, and to limit transmission of the collimated light to a wavelength of the modulated monochromatic beam of light; and
at least one second lens, in optical communication with the band-pass optical filter, to focus the light transmitted by the band-pass optical filter onto an active area of the image sensor,
a temporal modulator, operably coupled to the image sensor and at least one of the source of time-varying optical radiation or the diffractive optical element, to temporally modulate the monochromatic beam of light and synchronously trigger frame capture by the image sensor; and
an integrated circuit chip, operably coupled to the image sensor, the integrated circuit chip comprising:
an analog-to-digital converter (ADC) to digitize an analog signal produced by the image sensor in response to detection of the light transmitted by the band-pass optical filter;
an on-chip counter, in electrical communication with the ADC, to increment a count when the source of time-varying optical radiation is on and to decrement the count when the source of time-varying optical radiation is off; and
a processor configured to estimate a three-dimensional depth image of the scene based on the two-dimensional intensity image of the scene, a stored reference image, and a system calibration parameter representing a geometric arrangement of the system.

* * * * *